US009965962B1

(12) United States Patent
X et al.

(10) Patent No.: US 9,965,962 B1
(45) Date of Patent: May 8, 2018

(54) AERIAL ROBOTICS NETWORK MANAGEMENT INFRASTRUCTURE

(71) Applicant: SkyWard IO, Inc., Portland, OR (US)

(72) Inventors: X, Portland, OR (US); Jonathan Evans, Portland, OR (US); Andrew McCollough, Portland, OR (US); Dana Maher, Portland, OR (US); Jake Nylund, Hillsboro, OR (US); Eric Miller, Portland, OR (US); Chase Fiedler, Portland, OR (US)

(73) Assignee: Skyward IO, Inc., Portland, OR (US)

( * ) Notice: Subject to any disclaimer, the term of this patent is extended or adjusted under 35 U.S.C. 154(b) by 0 days. days.

(21) Appl. No.: 14/940,143

(22) Filed: Nov. 12, 2015

Related U.S. Application Data

(60) Provisional application No. 62/078,366, filed on Nov. 11, 2014.

(51) Int. Cl.
*G08G 5/00* (2006.01)
*B64C 39/02* (2006.01)
*G06F 17/30* (2006.01)
*H04L 29/08* (2006.01)
*G05D 1/00* (2006.01)
*G06Q 40/08* (2012.01)

(52) U.S. Cl.
CPC ......... *G08G 5/0043* (2013.01); *B64C 39/024* (2013.01); *G05D 1/0027* (2013.01); *G06F 17/30241* (2013.01); *G06Q 40/08* (2013.01); *G08G 5/0069* (2013.01); *G08G 5/0086* (2013.01); *G08G 5/0091* (2013.01); *H04L 67/12* (2013.01); *B64C 2201/14* (2013.01)

(58) Field of Classification Search
CPC .. G08G 5/0043; G08G 5/0086; G08G 5/0069; G08G 5/0091; B64C 39/024; B64C 2201/14; G06F 17/30241; H04L 67/12; G05D 1/0027; G06Q 40/08
See application file for complete search history.

(56) References Cited

U.S. PATENT DOCUMENTS 5,652,489 A * 7/1997 Kawakami ........... G05D 1/0242
318/568.12
6,690,997 B2 * 2/2004 Rivalto ................. G06Q 10/08
700/237
7,181,478 B1 * 2/2007 Korson ............. G06F 17/30563
707/667

(Continued)

FOREIGN PATENT DOCUMENTS

WO WO2004003680 1/2004
WO WO2005102875 11/2005

(Continued)

OTHER PUBLICATIONS

Liu, Lantao and Shell, Dylan A., "Abstract—Physically Routing Robots in a Multi-Robot Network: Flexibility Through a Three-Dimensional Matching Graph," The International Journal of Robotics Research, Oct. 2013, vol. 32, No. 12, 1 page.

(Continued)

*Primary Examiner* — Courtney D Heinle

(57) ABSTRACT

An Aerial Robotics Network (ARN) Management Infrastructure (MI) (also referred to as ARNMI) that provides a mechanism for the management of aerobots.

20 Claims, 18 Drawing Sheets

(56) References Cited

U.S. PATENT DOCUMENTS

| | | | | |
|---|---|---|---|---|
| 7,577,501 B2* | 8/2009 | Tafs | G07C 5/085 | 434/30 |
| 7,640,098 B2* | 12/2009 | Stenbock | G01C 23/005 | 340/995.1 |
| 7,861,181 B2* | 12/2010 | Kaminsky | G06F 9/4443 | 715/744 |
| 7,996,109 B2* | 8/2011 | Zini | G05B 19/41895 | 700/245 |
| 8,005,581 B2* | 8/2011 | Beacham, Jr. | G07C 5/085 | 701/3 |
| 8,209,248 B2* | 6/2012 | Dubinsky | G06F 17/248 | 705/35 |
| 8,306,685 B2* | 11/2012 | Yukawa | G01C 23/00 | 701/31.4 |
| 8,700,236 B1* | 4/2014 | Berman | G07C 5/008 | 701/15 |
| 2003/0070061 A1* | 4/2003 | Wong | G06F 8/38 | 712/220 |
| 2004/0105090 A1* | 6/2004 | Schultz | G01C 11/02 | 356/141.5 |
| 2005/0195096 A1* | 9/2005 | Ward | G01C 21/32 | 340/995.14 |
| 2007/0070070 A1* | 3/2007 | John | G06T 1/60 | 345/427 |
| 2007/0299946 A1* | 12/2007 | El-Damhougy | H04L 43/0811 | 709/223 |
| 2010/0066604 A1* | 3/2010 | Limbaugh | G08G 5/0013 | 342/357.31 |
| 2011/0016423 A1* | 1/2011 | Brubaker | G06F 3/0481 | 715/800 |
| 2011/0184902 A1* | 7/2011 | Feng | G06Q 50/06 | 706/47 |
| 2014/0146173 A1* | 5/2014 | Joyce | G01C 11/04 | 348/144 |
| 2015/0120094 A1* | 4/2015 | Kimchi | B64C 39/024 | 701/3 |
| 2015/0170524 A1* | 6/2015 | Stefani | G08G 5/0013 | 701/120 |
| 2016/0101855 A1* | 4/2016 | Stefani | G08G 5/0008 | 701/2 |
| 2016/0196525 A1* | 7/2016 | Kantor | G08G 5/0013 | 705/330 |

FOREIGN PATENT DOCUMENTS

| | | |
|---|---|---|
| WO | WO2009099403 | 8/2009 |
| WO | WO2012072356 | 6/2012 |
| WO | WO2013066535 | 5/2013 |

OTHER PUBLICATIONS

Liu, Lantao and Shell, Dylan A., "Tunable Routing Solutions for Multi-Robot Navigation Via the Assignment Problem: A 3D Representation of the Matching Graph," Department of Computer Science & Engineering, Texas A&M University, in Proceedings of IEEE International Conference on Robotics and Automation, IEEE, 2012, 18 pages.

\* cited by examiner

AERIAL ROBOTICS NETWORK MANAGEMENT INFRASTRUCTURE

The present application is an application claiming the benefit of U.S. Provisional Patent Application No. 62/078,366, filed Nov. 11, 2014. The present application is based on and claims priority from this application, the disclosure of which is hereby expressly incorporated herein by reference in its entirety.

BACKGROUND OF THE INVENTION

Described herein is an Aerial Robotics Network (ARN) Management Infrastructure (MI) (also referred to, herein, as ARNMI). The ARNMI may be implemented, for example, as a system, method, and/or apparatus. Unless specifically designated otherwise, ARNMI will include the system, method, and/or apparatus.

The ARNMI described herein builds on known technology including, but not limited to, network management of physical robots; automated flight records management; automated flight route and operations management; automated route and hazards mapping; automation of hangars or warehouse logistics management; automated compliance management and rules engines; and algorithms and methods for managing geospatial data in five dimensions.

Exemplary patents and other references related to network management of physical robots include, but are not limited to, PCT Patent Application Publication No. WO/2004/003680 entitled "System, Method and Apparatus for Automated Collective Mobile Robotic Vehicles Used in Remote Sensing Surveillance," U.S. Pat. No. 5,652,489 entitled "Mobile Robot Control System," and Liu and Shell entitled "Physically Routing Robots in a Multi-Robot Network: Flexibility through a Three-Dimensional Matching Graph (2013)."

Exemplary patents related to automated flight records management include, but are not limited to, U.S. Pat. No. 8,306,685 entitled "Electronic Logbook Flight Preparation System and Method," U.S. Pat. No. 8,700,236 entitled "Mobile Flight Logbook System and Method," U.S. Pat. No. 7,181,478 entitled "Method and System for Exporting Flight Data for Long Term Storage," U.S. Pat. No. 8,005,581 entitled "Systems and Methods for Communicating Aircraft Data," and U.S. Pat. No. 7,577,501 entitled "Methods and Systems for Automatically Tracking Information During Flight."

An exemplary patent related to automated flight route and operations management includes, but is not limited to, U.S. Pat. No. 7,640,098 entitled "Process for Generating Travel Plans on the Internet."

Exemplary patents and publications related to automated route and hazards mapping include, but are not limited to, U.S. Patent Application Publication No. 2014/0146173 entitled "Integrated Aerial Photogrammetry Surveys," PCT Patent Application Publication No. WO/2012/072356 entitled "Hazard Detection for Asset Management," and U.S. Patent Application Publication No. 2005/0195096 entitled "Rapid Mobility Analysis and Vehicular Route Planning from Overhead Imagery."

Exemplary patents and publications related to automation of hangars or warehouse logistics management include, but are not limited to, PCT Patent Application Publication No. WO/2013/066535 entitled "Methods and Systems for Automated Transportation of Items Between Variable Endpoints," PCT Patent Application Publication No. WO/2005/102875 entitled "Robotic Retail Facility," U.S. Pat. No. 7,996,109 entitled "Robotic Ordering and Delivery Apparatuses, Systems and Methods," and U.S. Pat. No. 6,690,997 entitled "System for Automated Package-Pick Up and Delivery."

Exemplary patents and publications related to automated compliance management and rules engines include, but are not limited to, U.S. Pat. No. 8,209,248 entitled "Method and System for Building Audit Rule Sets for Electronic Auditing of Documents," U.S. Patent Application Publication No. 2011/0184902 entitled "Business Rule Integration With Engineering Applications," PCT Patent Application Publication No. WO/2009/099403 entitled "Method and System for Providing a Widget for Displaying Multimedia Content," U.S. Patent Application Publication No. 2003/0070061 entitled "Transformation of Platform Specific Graphical User Interface Widgets Migrated Between Heterogeneous Device Platforms," U.S. Pat. No. 7,861,181 entitled "Autonomic User Interface Widgets," and U.S. Patent Application Publication No. 2011/0016423 entitled "Generating Widgets for Use in a Graphical User Interface."

Exemplary patents and publications related to applications of Hilbert-curve based searches include, but are not limited to, U.S. Patent Application Publication No. 2007/0070070 entitled "Method for Cache-Optimized Processing of a Digital Image Data Set."

The references cited above are hereby incorporated by reference in their entirety.

BRIEF SUMMARY OF THE INVENTION

Described herein is an Aerial Robotics Network (ARN) Management Infrastructure (MI) (also referred to, herein, as ARNMI). The ARNMI may be implemented, for example, as a system, method, and/or apparatus. Unless specifically designated otherwise, ARNMI will include the system, method, and/or apparatus.

An ARNMI, as described herein, preferably provides a mechanism for the management of aerobots that includes at least three of the modules selected from the group consisting of: (a) at least one generation and management of human-in-the-loop digital flight records module; (b) at least one telemetry generated enterprise flight records and command and control module; (c) at least one enterprise fleet management of multiple networks of aerobot module; (d) at least one airborne terrain hazard imaging acquisition and processing module; (e) at least one autonomous management of warehousing and aerobot storage facilities module; (f) at least one fixed network-wide sensing of hazards, weather conditions, hazard markings, feature markings, aircraft tracking, and deployment of enroute and terminal navigational aids module; (g) at least one integration of relevant real-time tracking of non-participating aircraft using ADS-B and other manned aviation aircraft tracking subsystems and enrichment of ARN route maps by consolidating airspace and ground overlay data module; and (h) at least one automated integration of insurance, regulatory, and certification information through human-in-the-loop management of related information module.

A method, as described herein, for implementing an ARNMI that provides a mechanism for the management of aerobots includes at least three steps selected from the group consisting of: (a) generating and managing human-in-the-loop digital flight records; (b) implementing telemetry generated enterprise flight records and command and control; (c) implementing enterprise fleet management of multiple networks of aerobots; (d) using an airborne terrain hazard module, providing imaging acquisition and processing; (e)

autonomously managing warehousing and aerobot storage facilities; (f) using a fixed network-wide sensing module, sensing hazards, weather conditions, hazard markings, feature markings, aircraft tracking, and deployment of enroute and terminal navigational aids; (g) integrating relevant real-time tracking of non-participating aircraft using ADS-B and other manned aviation aircraft tracking subsystems and enrichment of ARN route maps by consolidating airspace and ground overlay data; and (h) providing automated integration of insurance, regulatory, and certification information through human-in-the-loop management of related information.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary ARNMI and/or provide teachings by which the various exemplary ARNMI are more readily understood.

FIG. 6 is a supporting view of the relationship between record keeping (RK) of an aerobot in which it is assigned a unique RIN, situational awareness (SA) of the aerobot, and command and control (CC) of the aerobot.

Figure 1:
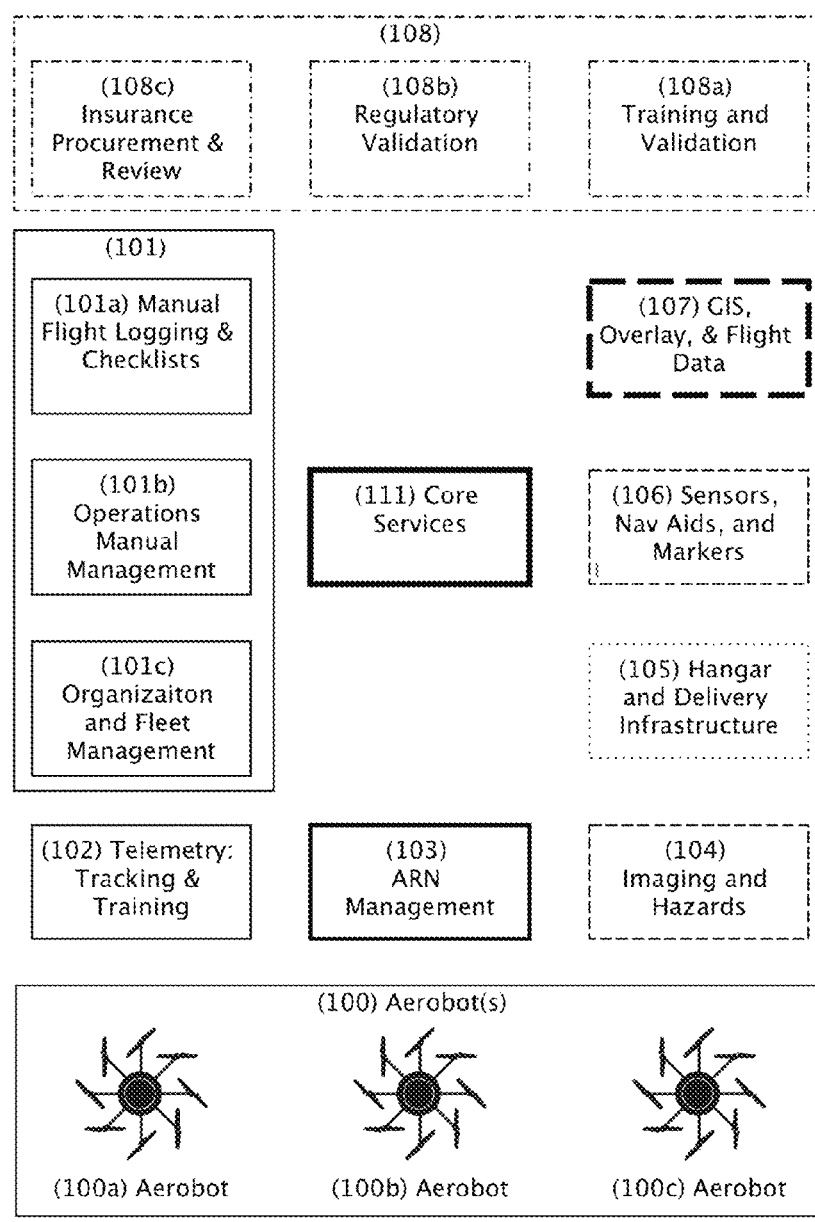
FIG. 1 is a high-level functional block diagram of the ARNMI architecture consisting of the following exemplary service modules: the manual flight logging and checklists module; the operations manual management module; the organization and fleet management module; the telemetry (tracking and training) module; the ARN management module; the imaging and hazards module; the aerobot hangar and delivery infrastructure module; the sensors, navigational aids, and markers module; the geographic information subsystem (GIS), overlay, and flight data module; the training and validation module; the regulatory validation module; the insurance procurement and review module; and the core services module.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein is an Aerial Robotics Network (ARN) Management Infrastructure (MI) (also referred to as ARNMI) that provides a mechanism for the management of aerobot(s) 100 (shown both as a group of aerobots 100 and as individual aerobots 100a, 100b, and 100c—but the use of the reference number 100 is meant to describe "at least one" aerobot). The ARNMI, as shown in FIG. 1, preferably includes a generation and management of human-in-the-loop digital flight records module 101 (which is shown as being divided into a manual flight logging and checklists module 101a, an operations manual management module 101b, and an organization and fleet management module 101c); a telemetry (tracking and training) module 102; the ARN management module 103; an imaging and hazards module 104; an aerobot hangar and delivery infrastructure module 105; a sensors, navigational aids, and markers module 106; a geographic information subsystem (GIS), overlay, and flight data module 107; a training and validation module 108a; a regulatory validation module 108b; an insurance procurement and review module 108c; and a core services module 111. Preferably, the core services module 111 supports the other modules. These modules are shown in FIG. 1.

The modules shown in FIG. 1 can be grouped into three basic groupings: a "workflow and digital system of record" grouping, an "ARN management system" grouping, and a "real-time transaction platform" grouping (which could also be referred to as an "AR compliance and regulatory system" grouping). The workflow and digital system of record (for recordation of flight records such as maintenance events, pilot (or operator) qualification status, or violations of restricted geometries) grouping may include, for example, the following modules: the generation and management of human-in-the-loop digital flight records module 101 and the telemetry generated enterprise flight records and command and control module (telemetry (tracking and training) module 102). The ARN management system grouping may include, for example, the following modules: the enterprise fleet management of multiple networks of aerobot module 103; the airborne terrain hazard imaging acquisition and processing module 104; the autonomous management of warehousing and aerobot storage facilities module 105; the fixed network-wide sensing of hazards, weather conditions, hazard markings, feature markings, aircraft tracking, and deployment of enroute and terminal navigational aids module 106; and the integration of relevant real-time tracking of non-participating aircraft using Automatic Dependent Surveillance-Broadcast (ADS-B) and other manned aviation aircraft tracking subsystems and enrichment of ARN route maps by consolidating airspace and ground overlay data module 107. Finally, the real-time transaction platform grouping may include, for example, the following modules: the automated integration of insurance, regulatory, and certification information through human-in-the-loop management of related information modules 108a, 108b, and 108c (jointly referred to with reference number 108).

The ARNMI described herein is directed to the holistic management of aerial robotics (AR) commercial operations at enterprise, metropolitan, and global scales. The ARNMI allows for a mixture of human-in-the-loop operations ranging from individual operators piloting a single aerobot within line-of-sight of the aircraft, to semi-supervised control of aerobots using a mixture of human control and autonomy for medium scale aerobot operations, to fully-autonomous large-scale management of aerobots with human oversight and override.

Current AR operations are largely managed through ground control stations (GCS) and optimized to individual operations. GCS normally provide flight planning, aircraft configuration, flight management, telemetry collection, and flight history. The operator piloting the aircraft via GCS or direct radio frequency (RF) controllers is responsible for managing flight records manually or in a separate platform. These GCS are also limited in their ability to manage fleets of aerobots and lack the ability to manage enterprise, urban, or global scale AR operations with regards to routing networks of multiple, simultaneous aerobots operating on an ARN and managing the associated routing infrastructures and ground based maintenance and logistics facilities. Furthermore, weather, airspace surveillance, and geographic information subsystem (GIS) data are segregated from the operational and network management portions of aerobot operations. Existent, feature complete, and mature GIS systems process, host, and serve vector and/or raster data, but these known systems lack internalization of real-time network generation and management, real-time rules-based decision making, and a system of record/historical rewind for data ingest and transformation. Further, known GIS systems rely on data formats that are not amenable to network management or fundamentally four-dimensional (e.g. x-axis, y-axis, z-axis, and time) or five-dimensional (e.g. x-axis, y-axis, z-axis, time, and velocity) operations. For example, current GIS systems might be able to support complex polygons and raster images, but current GIS systems lack support for shapes and, generally, natively three-dimensional objects. Finally, aerobot operators are generally required (by, for example, administrative rules and/or laws) to procure insurance, regulatory approvals, and certifications from governmental, commercial, and non-governmental organizations through a variety of manual and automated processes. The management of the data generated by these business processes is segregated from GCS and flight management subsystems, requiring redundant data-entry and disconnecting operational processes from business processes.

Currently, individual or small numbers of aerobots are piloted using radio controllers or automated ground control stations (GCS). The ARNMI scales the operation of aerobot operations not only through control and flight management of aerobots but also through enterprise fleet management features that provide a mixture of software as a service (SaaS) capabilities and infrastructure as a service (IaaS) software-to-hardware interfaces to not only provide information management functionality, but to also interact with the aerobots themselves, the routing infrastructure necessary for navigation, and the logistics infrastructure necessary for servicing aerobots and managing payloads such as specialized imagery sensors and transport packages. A preferred feature of some of the exemplary management of aerobot operations described herein is the management of an ARN that includes physical infrastructure as well as the algorithms and software subsystems for ARN corridor generation and ARN routing. Maintaining the ARN, as described herein, preferably has three-dimensional modeling and hazards mapping of corridors and terminal areas through collection and processing of imagery. To supplement management of the ARN, the ARNMI preferably provides regulatory, insurance, and certification integration.

Definitions

Before describing the ARNMI and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Aerobot(s) refers to any type of aerial mobile device or group of devices (device(s) that may be electromechanical or biomechanical) that can perform work autonomously, pre-programmed, or through human control. Exemplary Aerobots include, for example, aerial robots, drones, or balloon aircraft.

Aerial Robotics (AR) is the technology field relating to any type of aerial mobile device or group of devices (device(s) that may be electromechanical or biomechanical) that can perform work autonomously, pre-programmed, or through human control. The term "aerial" is meant to include aerodynamic forces that transport a vehicle or, in the vernacular, "flying."

An Aerial Robotics Network (ARN) is a system communicatively linking (directly or indirectly) multiple aerobots. Communications are usually wireless. Communications may be routed through a central system (e.g. a ground station).

The Aerial Robotics Network (ARN) Management Infrastructure (MI) (also referred to, herein, as ARNMI) system is used for the supervision or control (e.g. effectively operating and/or accomplishing) of essential operational resources associated with the ARN. The ARNMI described herein may be implemented, for example, as a system, method, and/or apparatus.

The ARN and/or the ARNMI described herein may have associated hardware, software, and/or firmware (a variation, subset, or hybrid of hardware and/or software).

The term "deconflict" refers to changing the flight path of at least one craft (e.g. aerobot(s)) to reduce the chance of an accidental collision or to insure availability of infrastructure services.

"Ingest," "ingestion," "data ingest," "data ingestion," and variations thereof are generally the process of obtaining, importing, and processing data and then storing the data for later use.

The term "feed" (and variations of this term) is meant to mean "provide" and/or "deliver" (and variations of these terms).

The term "consumed" (and variations of this term) is meant to mean "received" and/or "used" (and variations of these terms).

Figure 5:
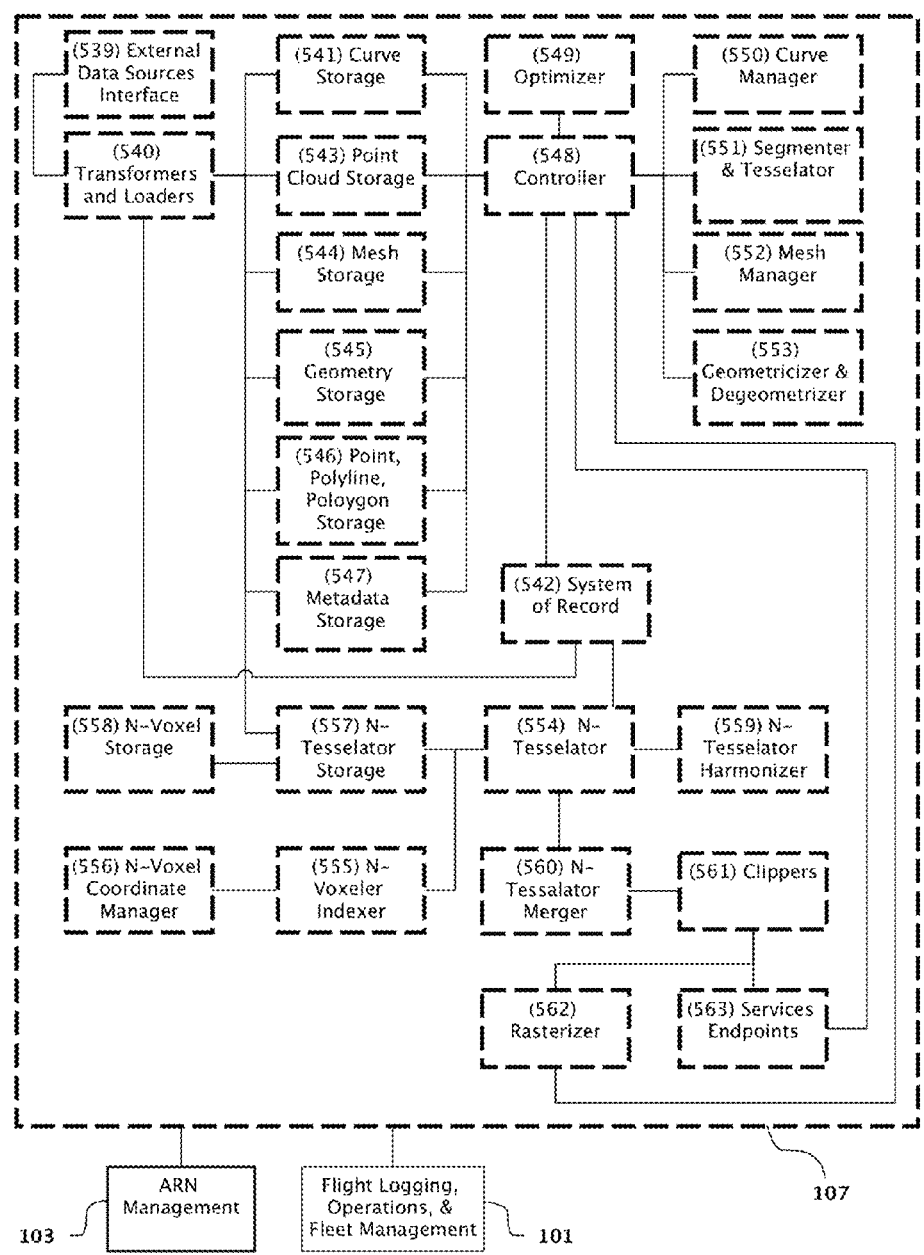
FIG. 5 is a more detailed block diagram showing a more detailed view of the GIS, overlay, and flight data module of FIG. 1, and further showing data acquisition, storage, and management, and still further showing exemplary relationships of these modules within the ARNMI architecture.

The phrase "system of record" means a data model, transport protocol, set of interfaces, and/or standalone system for capturing the initial ingest of data and any subsequent transformations and end uses of that data. As an industry standard, a system of record is a data management term for an information storage system that is the authoritative data source for a given data element or piece of information. Depending on its configuration, system of record may either capture all changes to objects of certain types, or may operate on important events from which data can be deterministically rewound or fast forwarded to its previous or next state. Further, the phrase "system of record" captures chaining and relationships of individual object changes or change events. Many of the modules may have a system of record associated with the specific module. For example, FIG. 5 shows the system of record 542 (that stores the geometries) that is specific to the GIS, overlay, and flight data module 107. This means that the system of record 542 maintains an auditable record of the changes to the GIS, overlay, and flight data module 107. It should be noted that systems of record from one module may be accessed by or shared with other modules.

The term "hardware" includes at least one "processing unit," "processor," "computer," "programmable apparatus," and/or other known or yet to be discovered device capable of executing instructions or steps. The term "software" includes at least one "program," "subprogram," "module," "submodule" (which may be considered modules within modules), "series of instructions," or other known or yet to be discovered hardware instructions or hardware-readable program code. Software may be loaded onto hardware (or firmware) to produce a machine, such that the software executes on the hardware to create structures for implementing the functions described herein. Further, the software may be loaded onto the hardware (or firmware) so as to direct the ARNMI to function in a particular manner described herein or to perform a series of operational steps as described herein. The phrase "loaded onto the hardware" also includes being loaded into memory associated with or accessible by the hardware. The term "memory" is defined to include any type of hardware (or other technology)-readable media (also referred to as machine-readable storage media) including, but not limited to, attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other known or yet to be discovered storage media. Depending on its purpose, the memory may be transitory and/or non-transitory. Appropriate "communications," "signals," and/or "transmissions" (which include various types of information and/or instructions including, but not limited to, data, commands, bits, symbols, voltages, currents, electromagnetic waves, magnetic fields or particles, optical fields or particles, and/or any combination thereof) over appropriate "communication paths," "transmission paths," and other means for signal transmission including any type of connection between two elements on the system would be used as appropriate to facilitate controls and communications.

The terms "processing unit," "processor," and "computer" are defined as devices capable of executing instructions or steps and may be implemented as a programmable logic device or other type of known or yet to be discovered programmable apparatus. The processor, processing unit, and computer may have associated memory. The processor, processing unit, and computer may be implemented using a general purpose processor (e.g. microprocessor, controller, microcontroller, or state machine), a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. Although shown as single units, it should be noted that the processing units may be implemented as a plurality of separate processing units. Similarly, multiple processors may be combined. For example, the main processing unit may be a separate processor from the processing unit in the first data server and/or the processing unit in the second data server or, alternatively, the functions of these processing units can all be combined into a single processing unit.

The term "memory" is defined to include any type of computer (or other technology)-readable media (also referred to as machine-readable storage media) including, but not limited to, attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other known or yet to be discovered storage media. Depending on its purpose, the memory may be transitory and/or non-transitory. For example, programs and subprograms are generally stored in non-transitory memory. Although shown as single units, it should be noted that the memories may be implemented as a plurality of separate memories. Similarly, multiple memories may be combined. For example, the first program may be stored in a memory separate from the memory in which the second program is stored. Another example is that the data used by the first server and/or the data used by the second server may be stored in distinct memories (not shown) accessible by the servers or the data may be stored in the shared memory and would be made accessible by the servers.

It should be noted that the terms "programs" (or "modules") and "subprograms" (or "submodules") are defined as a series of instructions.

The terms "communications," "signals," and/or "transmissions" include various types of information and/or instructions including, but not limited to, data, commands, bits, symbols, voltages, currents, electromagnetic waves, magnetic fields or particles, optical fields or particles, and/or any combination thereof. Appropriate technology may be used to implement the "communications," "signals," and/or "transmissions" including, for example, transmitters, receivers, and transceivers. "Communications," "signals," and/or "transmissions" described herein would use appropriate technology for their intended purpose. For example, hard-wired communications (e.g. wired serial communications) would use technology appropriate for hard-wired communications, short-range wireless communications (e.g. BLUETOOTH®, Ultra Wideband (UWB), or infrared or induction wireless) would use technology appropriate for short distance wireless communications, and long-range wireless communications (e.g. WiFi or Cellular) would use technology appropriate for long distance wireless communications. Appropriate security (e.g. SSL or TLS) for each type of communication is included herein.

When used in relation to "communications," "signals," and/or "transmissions," the terms "provide" and "providing" (and variations thereof) are meant to include standard means of provision including "transmit" and "transmitting," but can also be used for non-traditional provisions as long as the "communications," "signals," and/or "transmissions" are "received" (which can also mean obtained). The terms "transmit" and "transmitting" (and variations thereof) are meant to include standard means of transmission, but can also be used for non-traditional transmissions as long as the "communications," "signals," and/or "transmissions" are "sent." The terms "receive" and "receiving" (and variations thereof) are meant to include standard means of reception, but can also be used for non-traditional methods of obtaining as long as the "communications," "signals," and/or "transmissions" "arrive" or are "obtained." Transmissions and receptions may be accomplished by transmission and reception means known or yet to be discovered. Transmissions and receptions may be direct or indirect.

The term "associated" is defined to mean integral or original, retrofitted, attached, connected (including functionally connected), positioned near, and/or accessible by. For example, if a display (or other component) is associated with a computer (or other technology), the display may be an original display built into the computer, a display that has been retrofitted into the computer, a display that is attached to the computer, and/or a nearby display that is positioned near the computer. Another example is that systems of record associated with specific modules may be physically located within the modules and/or may be accessible by the modules.

It should be noted that relative terms (e.g. primary and secondary) are meant to help in the understanding of the technology and are not meant to limit the scope of the invention. Similarly, unless specifically stated otherwise, the terms "first," "second," and "third" are meant solely for purposes of designation and not for order or limitation.

The terms "may," "might," "can," and "could" are used to indicate alternatives and optional features and only should be construed as a limitation if specifically included in the claims.

Unless specifically stated otherwise, the term "exemplary" is meant to indicate an example, representative, and/or illustration of a type. The term "exemplary" does not necessarily mean the best or most desired of the type.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes," "has," and "contains" (and variations of these terms) mean "comprises" (e.g. a device that "includes," "has," or "contains" A and B, comprises A and B, but optionally may contain C or additional components other than A and B).

It should be noted that, unless otherwise specified, the singular forms "a," "an," and "the" refer to one or more than one, unless the context clearly dictates otherwise. Similarly, unless specifically limited, the use of singular language (e.g. "component," "module," or "step") may include plurals (e.g. "components," "modules," or "steps"), unless the context clearly dictates otherwise.

Exemplary ARNMI may be better understood with reference to the drawings, but these drawings are not intended to be of a limiting nature. The same reference numbers will be used throughout the drawings and description in this document to refer to the same or like parts.

FIGS. 1-5 are block diagrams and/or flow charts illustrating ARNMI system(s), method(s), and/or apparatus(es). It will be understood that each block of these figures, components of all or some of the blocks of these figures, and/or combinations of blocks in these figures, may be implemented by software (e.g. coding, software, computer program instructions, software programs (modules), subprograms (submodules), or other series of computer-executable or processor-executable instructions), by hardware (e.g. processors, memory), by firmware, and/or a combination of these forms. Accordingly, blocks of the figures support combinations of steps, structures, and/or modules for performing the specified functions. It will also be understood that each block of the figures, and combinations of blocks in the figures, may be divided and/or joined with other blocks of the figures without affecting the scope of the invention. This may result, for example, in computer-readable program code being stored in whole on a single memory, or various components of computer-readable program code being stored on more than one memory. It should be noted that blocks of the figures not specifically described as "modules" or "systems" may be or may be implemented as "modules" or "systems."

As set forth herein, FIG. 1 shows the high-level functions and structure of the ARNMI architecture consisting of the following exemplary service modules: an Enterprise Fleet Management (EFM) subsystem 101 (which is generically referred to as a generation and management of human-in-the-loop digital flight records module 101 that may be divided into the manual flight logging and checklists module 101*a*, the operations manual management module 101*b*, and the organization and fleet management module 101*c*); the telemetry (tracking and training) module 102 (a telemetry generated enterprise flight records and command and control module); the ARN management module 103 (an enterprise fleet management of multiple networks of aerobot module); the imaging and hazards module 104 (an airborne terrain hazard imaging acquisition and processing module); the aerobot hangar and delivery infrastructure module 105 (an autonomous management of warehousing and aerobot storage facilities module); the sensors, navigational aids, and markers module 106 (a fixed network-wide sensing of hazards, weather conditions, hazard markings, feature markings, aircraft tracking, and deployment of enroute and terminal navigational aids module); the GIS, overlay, and flight data module 107 (this module handles integration of relevant real-time tracking of non-participating aircraft using ADS-B and other manned aviation aircraft tracking subsystems and enrichment of ARN route maps by processing geospatial information, indexing those data, managing related metadata, and consolidating airspace and ground overlay data); the automated integration of insurance, regulatory, and certification information through human-in-the-loop management of related information module 108 (this is shown as being divided into the training and validation module 108a, the regulatory validation module 108b, and the insurance procurement and review module 108c); and the core services module 111. The core services module 111 of the ARNMI supports the other modules.

Figure 2:
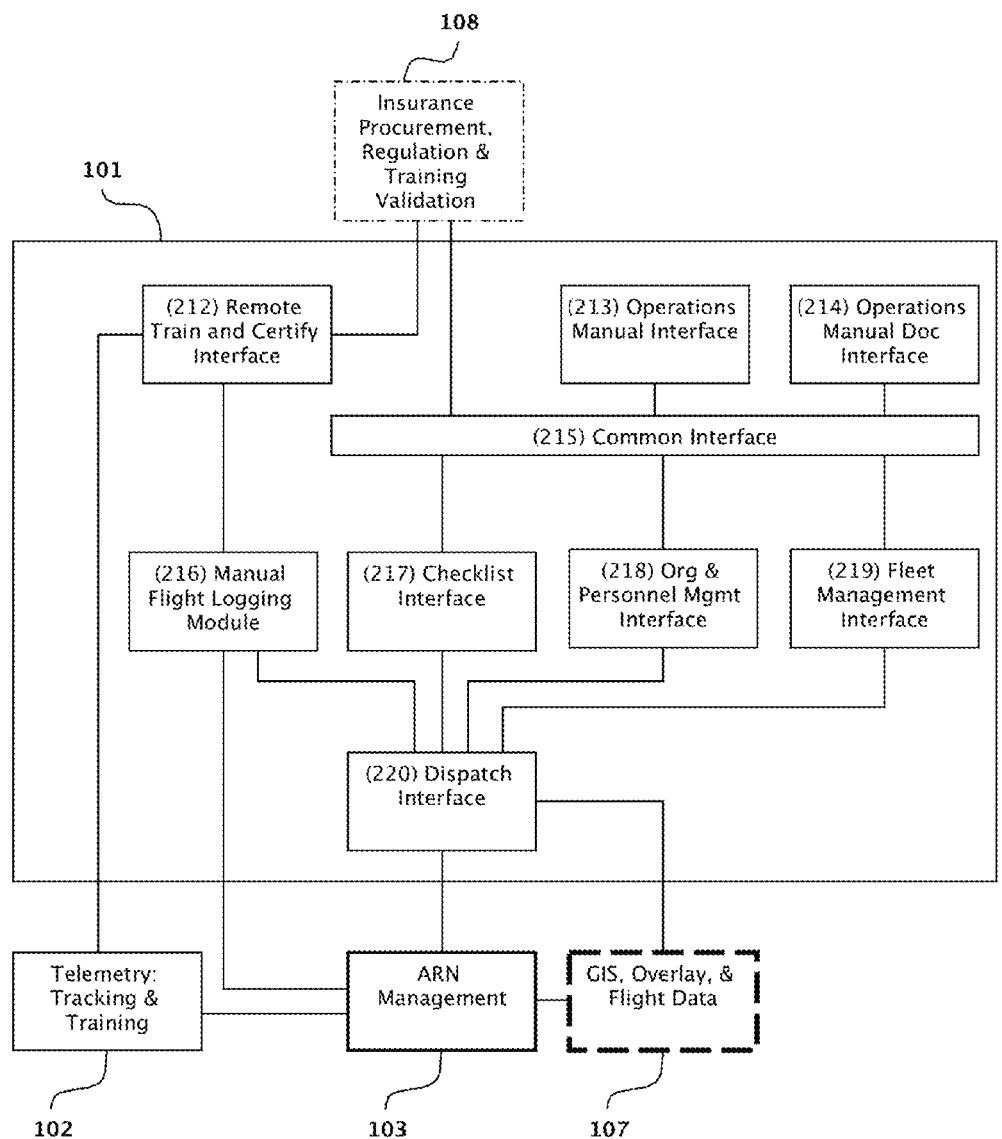
FIG. 2 is a more detailed block diagram of the combined manual flight logging and checklists module, the operations manual management module, and the organization and fleet management module of FIG. 1, and showing exemplary relationships of these modules within the ARNMI architecture.

FIG. 2 shows additional details pertaining to the combined manual flight logging and checklists module 101a, the operations manual management module 101b, and the organization and fleet management module 101c, as well as exemplary relationships of these modules within the ARNMI architecture. The EFM 101 preferably provides interfaces to AR for remote video and telemetry based training and certification module 212 (which may be used, for example, as an automated assessment of the operator's performance as a pilot based upon certain flight rules that could be determined based on applicable rules and laws). The EFM 101 also preferably provides interfaces to AR for telemetry-based AR interface for collecting aircraft data (e.g. velocity, location, altitude, etc. over time) from the telemetry (tracking and training) module 102). The aircraft data may be fed to various aircraft and personnel digital flight records modules within the EFM 101, as well as to various other modules within the ARNMI that need the aircraft data. The EFM 101 preferably provides the human-machine interfaces for manual flight logging using web forms and website based workflows for collecting flight information such as: hours flown, faults found, aerobot configuration, and other standard aircraft logbook and maintenance tracking information 216; AR procedural checklist generation and use through checklist editors, and interface for starting and filling checklists that may consist of simple Boolean checkmark information or may include more complex data such as battery voltage levels and other relevant data collected during checklist completion 217; organizational and personnel management 218; fleet management 219; aircraft and crew dispatch 220; operations manual generation and management 213; and related management of documents and media such as scanned images related to operations manual documents 214. The flight information may be entered, for example, manually using the human-machine interfaces (common interface module 215) for manual flight logging. It is through the common interface module 215 that a human-in-the-loop could procure insurance, report to a regulatory body, or report to a training provider their operational performance 108. You could also view it as the avenue through which an insurer, regulator, and trainer checks up on (or verifies the compliance of) the performance of the human-in-the-loop and/or their aerobot(s). Aside from the common interface module 215, the training and certification module 212 could provide telemetry-based training performance information to a trainer or other party in the information module 108. The common interface module 215 may be implemented, for example, as a web application. The ARN management module 103 may be used to enforce rules on the aerobot's 100 interaction with other aircraft based upon information input through modules 217, 218, and 219. The GIS, overlay, and flight data module 107 delivers GIS airspace information that the aerobot 100, the human operator, or both use to determine safe and appropriate places to fly.

Figure 3:
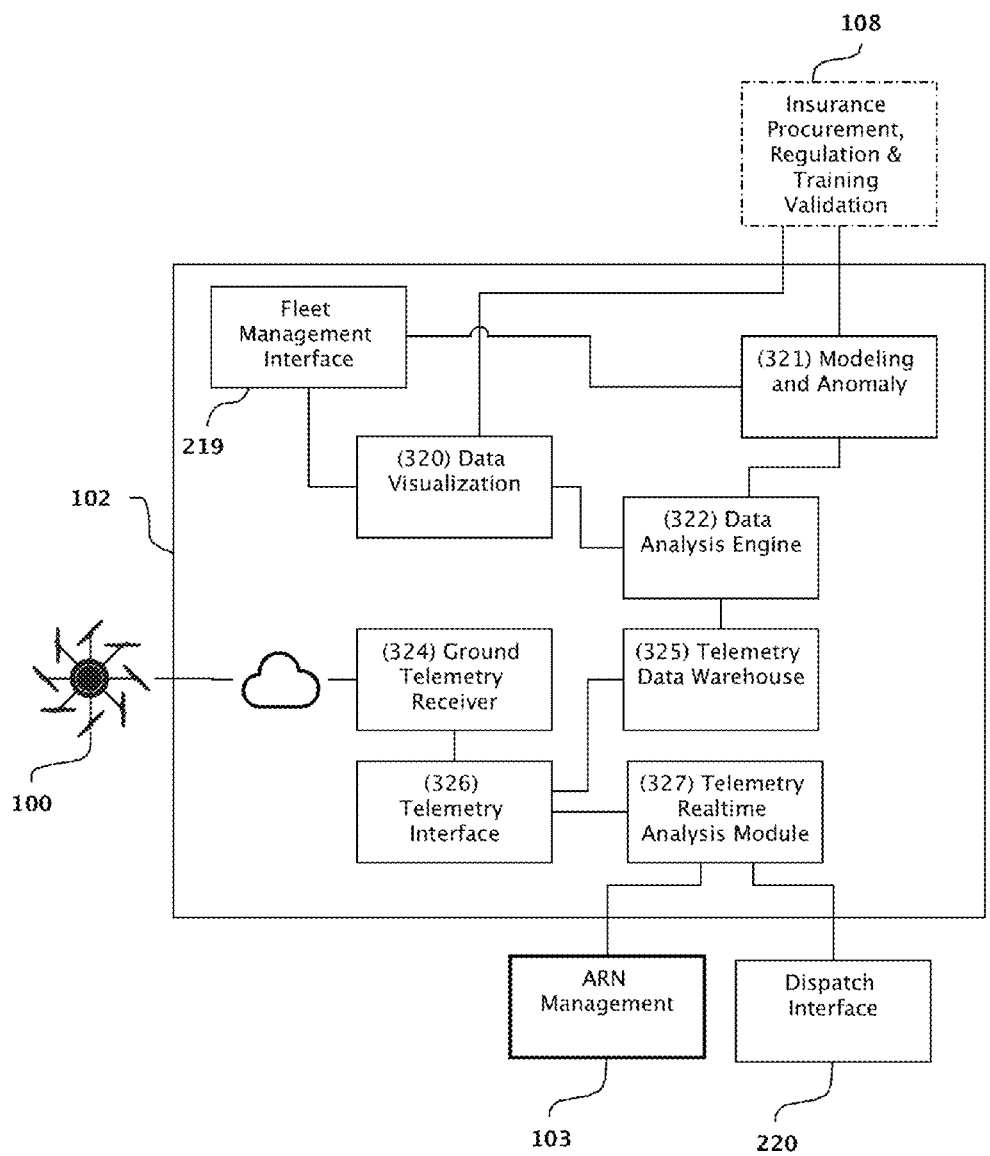
FIG. 3 is a more detailed block diagram showing a more detailed view of the telemetry (tracking and training) module of FIG. 1, describing the relationship between modules consuming and/or ingesting aerial robotic (AR) telemetry.

FIG. 3 shows additional details pertaining to the AR telemetry (tracking and training) module 102 and describes the relationship between modules consuming and/or ingesting aerial robotic (AR) telemetry from at least one aerobot 100. The telemetry (tracking and training) module 102 is preferably the interface between the EFM 101 and information related to AR operations. The "information" may be, for example, data that is received by (arrives to) the telemetry (tracking and training) module 102 from autopilot telemetry or specialized telemetry modules on board the aerobot(s) 100 with delivery of telemetry either via wireless/RF channels or synchronized via USB or other cable connections into a ground telemetry receiver 324 that is either a stand alone module or integrated into off-the-shelf commercial computing. The data may then be transmitted (passed) from the ground telemetry receiver 324 into the ARNMI through telemetry interface 326 which passes the data into a telemetry data warehouse 325 and a telemetry real-time analysis module 327.

One preferred role of the real-time analysis module 327 is to provide data analysis for time critical monitoring, situational awareness, anomaly or emergency alerting, or other aircraft status information relevant to real-time monitoring of the ARNMI. The real time analysis module 327 preferably provides location information and flight characteristics for ARN management 103 for infrastructure as a service management or to the organizational dispatch interface 220 for aerobot operators either operating on or off the ARNMI, which is normally connected through ARN Management 103.

For non mission-critical, non real-time data, telemetry may be collected into a database backed telemetry data warehouse 325 where telemetry information may be collected for offline analysis, data mining, or near real-time applications. From the data warehouse 325, information is preferably fed to a data visualization engine 320 for presentation via browser or data analysis engine 322 and to a modeling and anomaly engine 321 for characterizing flight operations of the aerobot(s) 100. Once the data visualization and models are prepared, they may be consumed and/or ingested by organizational flight, dispatch, and management personnel via the fleet management interface 219. Similarly, visualization and model information may be consumed and/or ingested by the insurance, regulatory, and validation modules 108a, 108b, 108c to generate actuarial data and validate insurance policy conditions, to automate regulatory compliance checks, and to provide information for certification and validation entities module 108.

Figure 4:
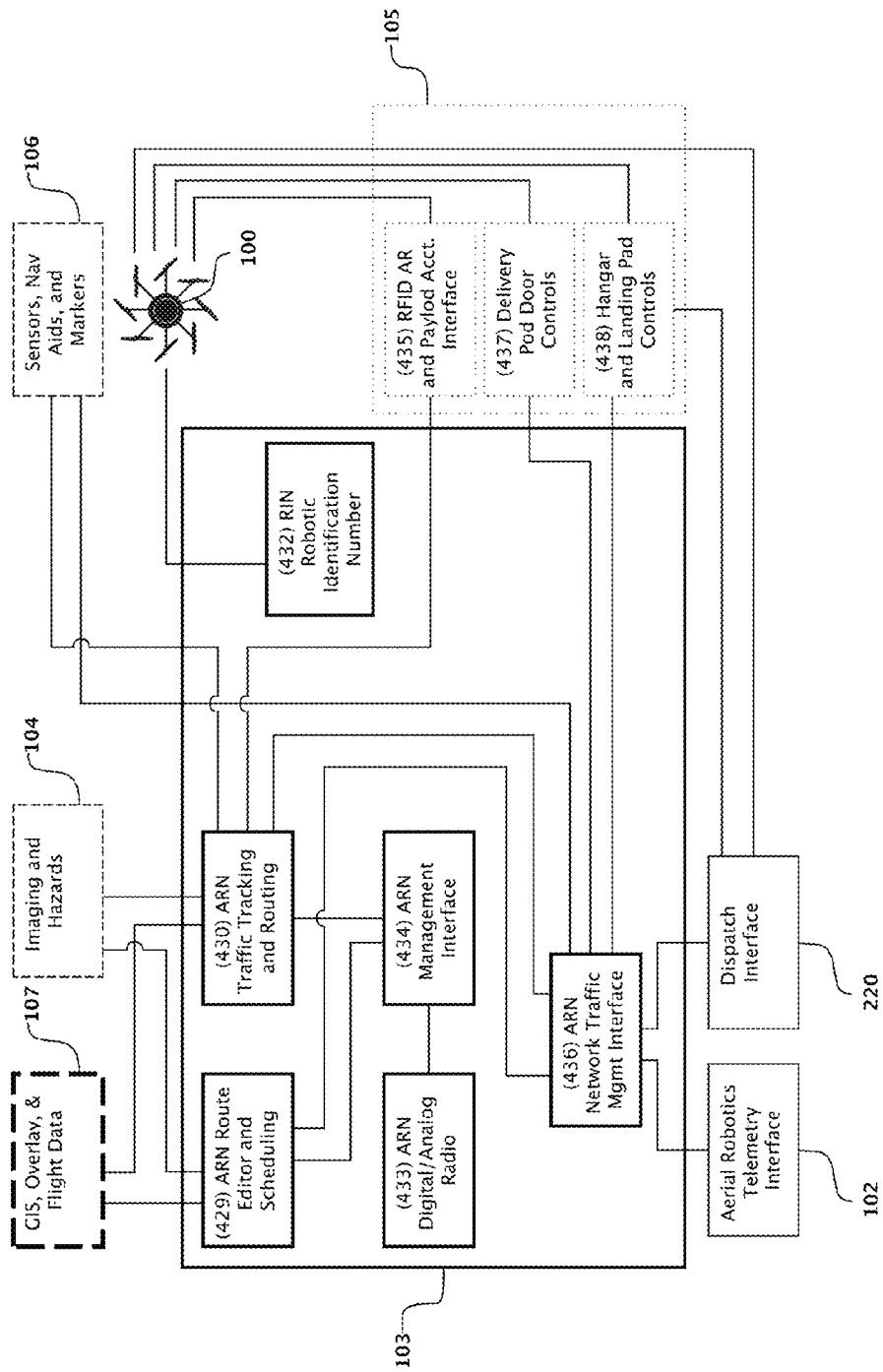
FIG. 4 is a more detailed block diagram showing a more detailed view of the ARN management module and the aerobot hangar and delivery infrastructure module of FIG. 1, and showing exemplary relationships of these modules within the ARNMI architecture.

FIG. 4 shows additional details pertaining to the ARN management module 103 and the aerobot hangar and delivery infrastructure module 105, as well as exemplary relationships of these modules within the ARNMI architecture. The ARN management module 103 is shown as including, for example, the ARN network traffic management interface module 436 for organizing aerobot sensors, navigation, routing, and other associated modules. The ARN operations management subsystem 103 preferably provides the mechanism for developing networks of AR corridors (using the ARN route editor and scheduling module 429), tracking corridor traffic (using the ARN traffic tracking and routing module 430), and providing routing and route resolution algorithms for moving aerobots along a network of aerial routes (using the ARN traffic tracking and routing module 430). In addition, the ARN operations management subsystem 103 preferably provides the mechanism for airspace deconfliction, control, and communications management for several aircraft (the ARN management interface module 434) by providing centralized visual observation where required, and centralized ground-to-air and ground-to-ground communications via voice, digitized voice, or digital communications (the ARN digital/analog radio module 433). The ARN management modules interface with the AR aircraft (aerobot(s) 100) via the network traffic management interface 436 to the telemetry (tracking and training) module 102 through the dispatch interface 220 providing command and control. In addition to modules on the aerobot providing telemetry, ARNMI aerobots preferably uniquely identify themselves using a robotic identification number (RIN) 432 and 664. The RIN 432 is preferably a unique identifier for each aerobot 100 which enables other functionality of ARN management module 103. The RIN may be an IPV6 compatible number that allows Internet-of-Things (IoT) integration of aerobots into the ARN. Preferably, the RIN is paired to the aerobot(s) 100 using a RIN module configured with the RIN, security check measures, and aerobot autopilot interfaces for flight safety monitoring and RIN reporting to the autopilot or GCS. The RIN may also be paired with a generic name for the aerobot based on a registered domain 888. The domain may utilize the drone top level domain or another domain registered by an administrator (e.g. an administrative computer, a person, and/or business entity). In addition, the RIN module preferably provides wireless RIN interfaces for reading and configuring the RIN and associated aerobot metadata.

FIG. 5 is a more detailed block diagram showing a more detailed view of the GIS, overlay, and flight data module 107 of FIG. 1. FIG. 5 also shows data acquisition, storage, and management associated with the ARNMI architecture. Still further, FIG. 5 shows exemplary relationships of these modules within the ARNMI architecture.

The exemplary GIS, overlay, and flight data module 107 (also referred to as the GIS system 107) shown in FIG. 5 enables geospatial information storage, quantification, provenance analysis, and retrieval at scale (able to handle whatever amount of data is presented). These capabilities preferably provide the backbone and transport protocols for the ARN, and this GIS system 107 connects directly with the dispatch interfaces 220 of the ARNMI. This figure shows the generalized architecture representing a feature complete GIS system 107 processing, storage, and querying system, analogous in its breadth to mature systems such as those provided by ESRI map and geoprocessing servers, but expanded to meet the requirements of the ARNMI and built on top of novel components. The external data sources interface module 539 receives data such as building projections or airspace shapes from data sources such as cities or aviation regulatory bodies and forwards it to the transformers and loaders module 540. Modules 540 through 549 show a generalized, templatable system for setting up automated ingest and a system of record 542 (which store the geometries) for a GIS data resource or stream of GIS data resources. Modules 541 through 547 represent storage and transport formats that may be used by the GIS system 107. Module 542, representing the system of record, also tracks data transforms (modules 550 through 561) and end uses (modules 562 and 563). Of these transforms, the n-tesselator is notable as a system for generating structures of adjacent, addressable geometries in n dimensions, used to quantize, store, and retrieve GIS data and to provide quantized, addressable spatial volumes for the ARN. One preferred approach uses a tesselated structure with at least some drone-specific search functionality and data structures. N-tesselation is discussed in more detail in conjunction with FIGS. 10-18.

FIGS. 6-9 are block diagrams and/or flow charts that show the federated (in that the registration system does not reside within one centralized database or administration) registration system that utilizes the robotic identification number (RIN).

Figure 6:
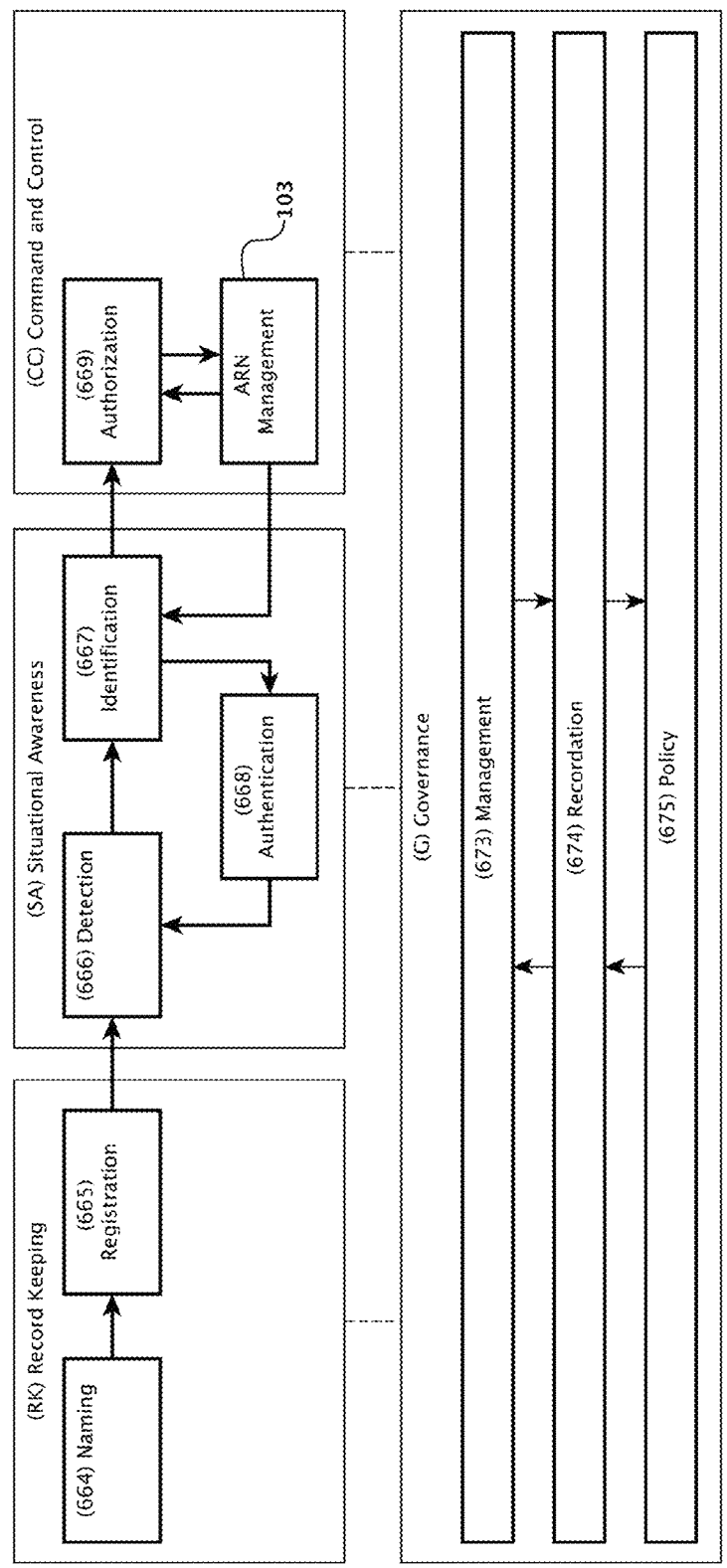
FIG. 6 is a block diagram showing the larger process in which registration of a robotic identification number (RIN) resides.

FIG. 6 shows the larger process in which registration of an RIN resides. Specifically, this figure shows a supporting view of the relationship between record keeping (RK) (also see FIG. 7) of an aerobot in which it is assigned a unique RIN, situational awareness (SA) (also see FIG. 5) of the aerobot, and command and control (CC) (also see FIG. 4) of the aerobot(s) 100. SA is the means by which an aerobot is detected 666, identified 667, and authenticated 668 within a certain space and time and preferably using the context that may be provided by GIS, overlay, and flight data module 107 (FIG. 5). After authorization 669, the ARN management module 103 (FIG. 2) is able to CC the aircraft (aerobot(s) 100) for network trafficking and routing. Throughout the entire process of RK, SA, and CC there may be governance (G) activities of management 673, recordation 674, and policy 675 which may be pertinent to the ongoing administration of the registration framework.

Figure 7:
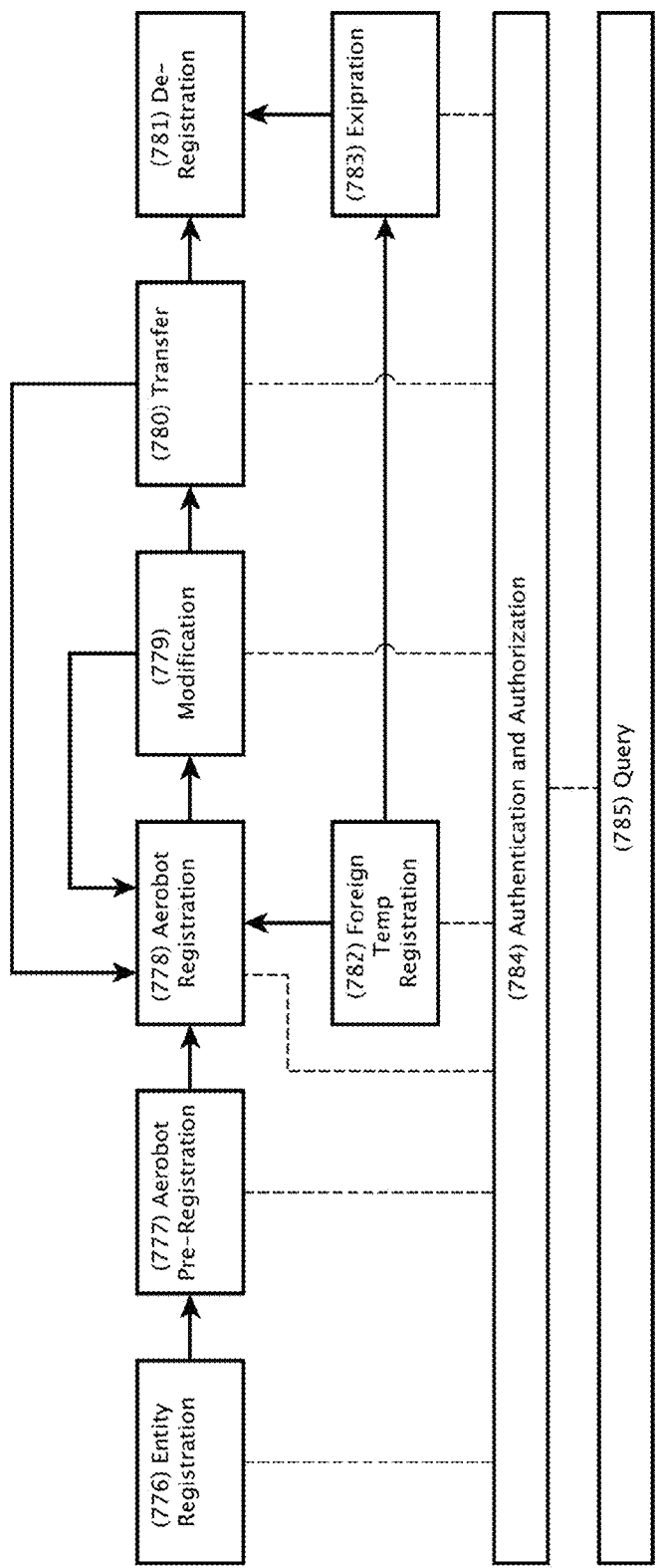
FIG. 7 is a more detailed block diagram showing a more detailed view of the registration module of FIG. 6, describing the registration business process for an ARN connected aerobot.

FIG. 7 provides additional detail related to the registration module 665 of FIG. 6. Specifically, FIG. 7 shows the registration business process for an ARN connected aerobot 100. Using the business process of registration 665, an entity 889 (which may be, for example, a registrar, record keeper, or owner) is registered 776. The aerobot(s) 100 can be pre-registered 778 by a manufacturer or reseller to aid the owner 895 in the registration process. This would more easily enable delivery of product defect information, software and firmware updates, airspace updates, etc. to the aerobot(s) 100. Once the aerobot(s) 100 is/are registered 778 the registry information associated with the aerobot(s) 100 may be modified 779 or transferred 780. An aerobot may also be de-registered 781 (it is no longer in service and is removed from the registry). There is also a provision for a temporary registration 782 in the case of a foreign-owned aerobot crossing international boundaries for operation and the subsequent expiration 783 of that temporary registration. Throughout the registration business process there are authentication and authorization 784 processes associated with managing the registry. There are also query 785 mechanisms to add, modify, delete, or change ownership data.

Figure 8:
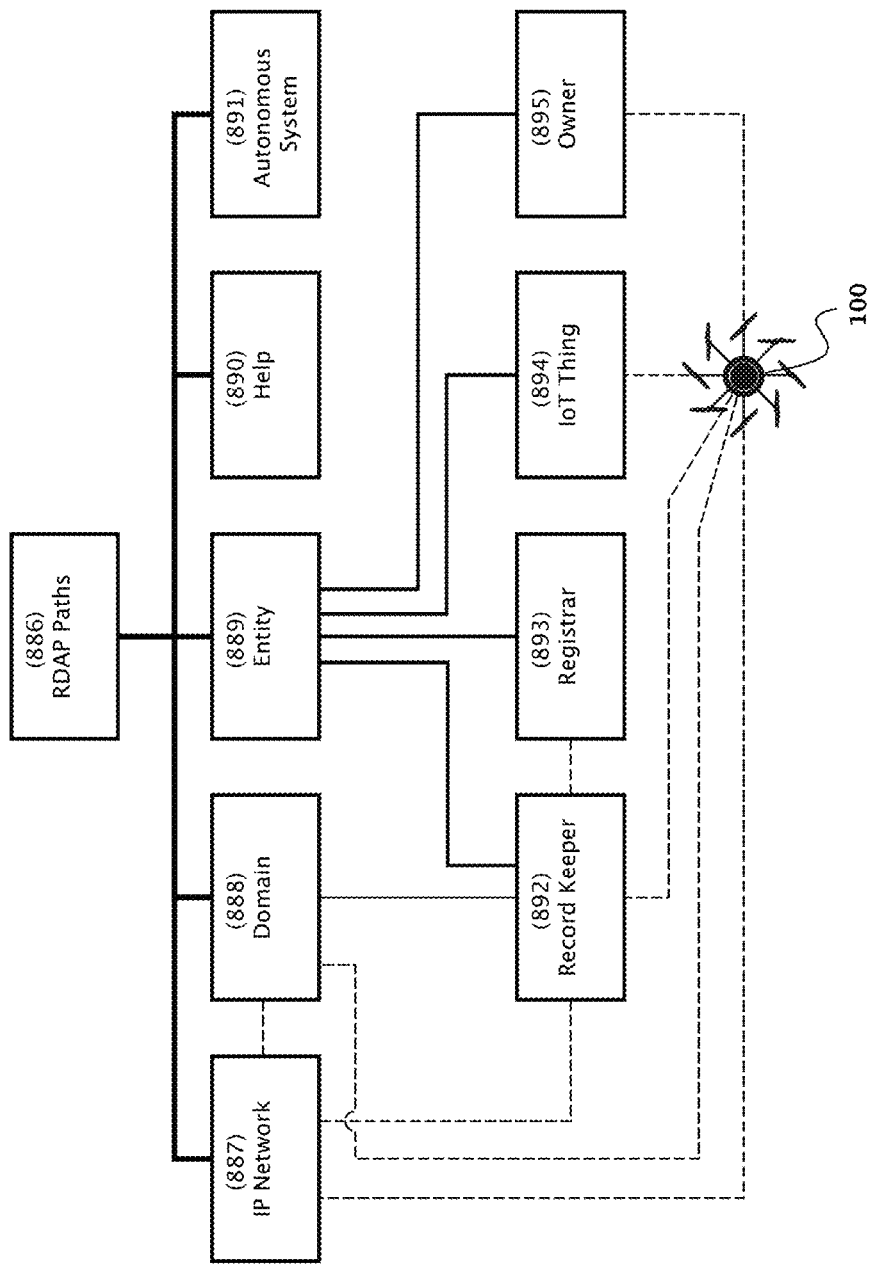
FIG. 8 is a block entity diagram showing exemplary modules of a preferred Registration Data Access Protocol (RDAP) based registration process for an ARN connected aerobot.

FIG. 8 shows exemplary modules of a preferred Registration Data Access Protocol (RDAP) based registration process for at least one ARN connected aerobot(s) 100. The RDAP specification enumerates the paths of modules 887 through 891. Module 889, the entity path, may be extended so that it is possible for the registrar 893 to extend the registry. Modules 892 through 895 show the paths for an aerobot Internet of Things (IoT) registry 894. These entities may have relations and also role permission relationships. A registrar 893 is allocated an IPv6 block and domain naming authority for some domain (potentially a gTLD such as ".drone" or a second level domain such as "uasregistration.org"). The registrar 893 manages top level relationships with IP and domain name authorities. The registrar 893 may manage record keepers 892 within the registry. The difference between a registrar 893 and a record keeper 892 is that a registrar 893 maintains the overall IP space and domain name management, but a record keeper 892 is responsible for a segment of the domain and/or IP space and using the system's interfaces for managing top level recordkeeping for drone registrations. The record keeper 892 connects the drone registrants (or owners 895) to the system, pre-registers drones, and manages the portions of the system that may require human intervention for the registrants. The aerobot 100 is an extension of an Internet of Things entity 894 and may include things such as a serial number and may be linked to an IPv6 identifier. The record keeper 892 may apply the physical markings (i.e. nameplate) that includes the IPv6 identifier. The owner entity 895 will include the contact information that may be required by the record keeper (RK) based on record keeper 892, registrar 893, and/or jurisdictional requirements.

Figure 9:
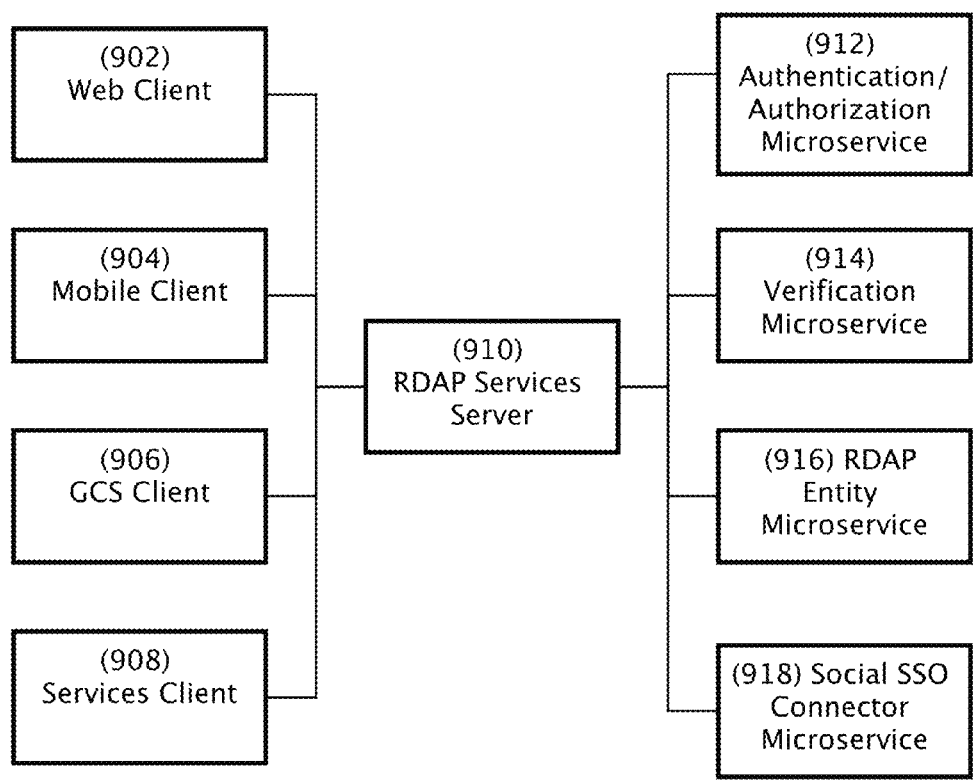
FIG. 9 is a top level system diagram for a preferred exemplary RDAP based registration that facilitates microservices (exemplary microservices shown on the right side of the figure) to client types (exemplary client types shown on the left side of the figure).

FIG. 9 shows a preferred exemplary RDAP based registration that facilitates microservices (such as those detailed on the right side of the figure) to client (such as those detailed on the left side of the figure). The RDAP based registration may be the registration module 665 of FIG. 6. The RDAP, or similar, server may facilitate other services not detailed in the diagram as these services are just meant to be exemplary and not to limit the scope of the invention. The RDAP, or similar, server may connect to clients not detailed in the diagram as these clients are just meant to be exemplary and not to limit the scope of the invention. Using the registration module 665 as an example, the registration module 665 may rely upon an RDAP services server 910. Modules 902 through 908 (web client 902, mobile client 904, GCS client 906, and services client 908) preferably provide interfaces into the registration module 665. The RDAP services server 910 preferably provides the central services server for the various potential clients. An authentication/authorization microservice 912 may be used to implement the standards specified by RDAP as well as role management. The verification microservice 914 preferably provides identity verification via services such as phone calls following other contemporary verification approaches used by Internet registrars, the RDAP entity service 916 will manage the registration module's 665 core business data, and the social single sign on (SSO) connector microservice 918 will preferably provide a mechanism for individuals to use social accounts such as FACEBOOK®, LINKEDIN®, and TWITTER® for identification.

In addition to the ARN operations management functionality for route and network management, the ARNMI preferably includes two specialized aircraft for management of the imaging and hazards network 104. The first aircraft is the AR procedures robot (ARPR) which collects image information for the generation of 3D models of the routes to ensure that ARN routes are free of obstacles for the tolerances necessary for GPS flight of aerobots. In addition, a second aerobot (the control, airspace, and recovery aerobot) may provide redundant control and communications, airspace surveillance and reporting as well as downed aerobot location services using RF localization.

The sensing, navigational aids, and marking 106 interface preferably provides a mechanism for configuration, health and status monitoring, and control of markers. Enroute RF and visual navigational aids may provide a way for aircraft to ascertain route position while aircraft tracking modules allow secondary tracking of aircraft independent of self-reporting. Visual and RF markers may allow for hazard marking of areas to avoid or feature markers for checkpoints or landing site identification. Terminal navigational aids and markers may provide a method for aircraft redundancy in landing independent of GPS navigation and altimeter based landing modalities. Stationary or airmobile terrain scanners and weather monitoring stations may provide three-dimensional terrain maps and weather data through the appropriate interfaces.

The autonomous AR warehousing and storage control interfaces (part of module 105) preferably communicate with the inventory RFID management subsystem 435, aircraft health and maintenance telemetry (not shown), hangar and landing pad controls module 438, and associated terminal navigational aids (part of module 106), and runways 438. The enrichment data interfaces preferably provide a mechanism for airspace surveillance data from ADS-B and related subsystems as well as secondary airspace surveillance from ADSI and other non-real time airspace monitoring solutions 107. In addition, airspace route, airport, and other National Airspace System data, environmental data such as weather, and ground GIS information such as critical infrastructure areas may be provided through these interfaces.

Using the data gathered in modules 101 through 106, the real time transaction platform (RTTP) (part of module 108) may provide a mechanism for developing actuarial tables, and sharing operator risk information, and aircraft histories with insurers 108c. RTTP may use telemetry feed analysis, similar to those used in module 212. RTTP and interfaces similar to RTTP allow regulators to audit regulatory compliance and digitize regulatory approval 108b. Finally, certifier interfaces may provide a mechanism for third-party certifiers such as training institutions to manage certifications for aircraft, personnel training, and operations 108a.

FIGS. 10-18 illustrate how the geospatial components of the ARNMI manage to map, partition, and index geospatial information. It should be noted that these figures represent two-dimensional schemas for storing geometries and associated metadata across a tile grid generated by an n-tessellator variant. These figures also note the transformation of complex polygons into more efficient storage formats, such as circles or arcs (see different storage formats outlined by sub-components in FIG. 5). Querying of these structures is accomplished by indexing the structures with space filling curves for two dimensions and/or three dimensions, by storing indexes of adjacent shapes, and by various computational geometry methods for determining which addresses are relevant to a search area or other n-dimensional geometry. To support GIS for IoT, this system may function in four to five dimensions (e.g. x, y, z, time, and possibly velocity depending on the data in question). However, the underlying system of searchable, tessellated spatial structures is generalizable to n-dimensions and may be used in a wide variety of configurations. These structures may function as both an indexing system and data container, or may function as searchable indices matched to a more traditional storage structure. Further, the adjacency guaranteed by tessellation allows for the use of these structures as addressable components of a routing network. For routing use cases, cells within the tessellated, addressable structure are used as containers for some number of aerobots, and local deconfliction occurs as aerobots request to pass between cells. The automated ingest system (modules 540 through 549) discussed in relation to FIG. 5 is used to source, generate, validate, and install these n-dimensional, tessellated, indexed geospatial structures.

Traditional GIS data formats and most existing geospatial datasets store geometries as complex polygons, which represent all of the geometries' vertices. This format is sufficient for simple polygons, but it is inefficient for storing circles and circular arcs (i.e. partial circles), which must be approximated by a very large number of points. This problem is especially important for an airspace management system, which must process many datasets consisting largely of circular arcs. An added difficulty is that the Earth is approximately spherical, which depends on a much different geometry than the familiar Euclidean geometry of the plane. For example, the shortest path between two points on the plane is a straight line, whereas on the sphere it is a great circle, which looks like a curved path on most planar map projections. Thus, the system described herein uses a heuristic-based algorithm that uses spherical geometry for detecting circles and circular arcs from complex polygons. The algorithm includes calculations for approximating the center point, radius, curvature angles, start angles, and end angles of potential circles. This allows us to store circles and circular arcs in a much more spatially efficient format. Circles are represented by their center point and radius; circular arcs are represented by their center point, radius, start angle, and end angle.

Figure 10:
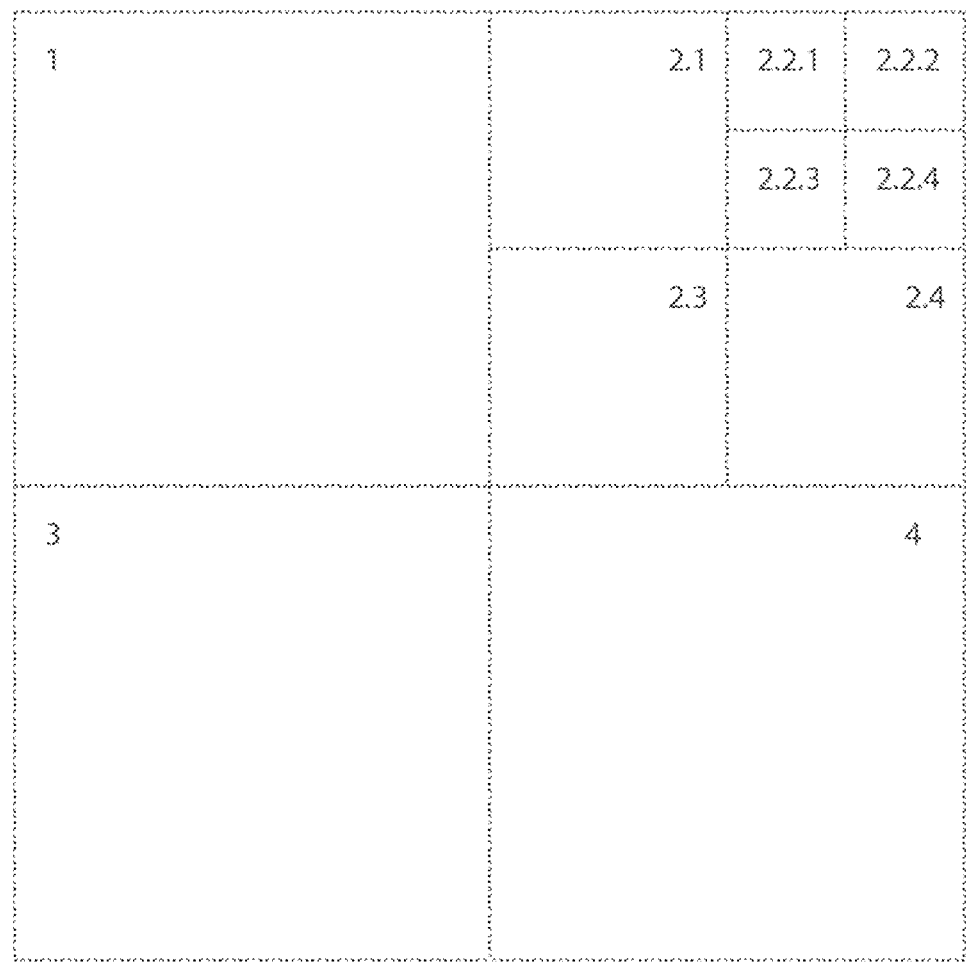
FIGS. 10-18 are diagrams illustrating how the geospatial components manage mapping, partitioning, and indexing geospatial information.
Figure 11:
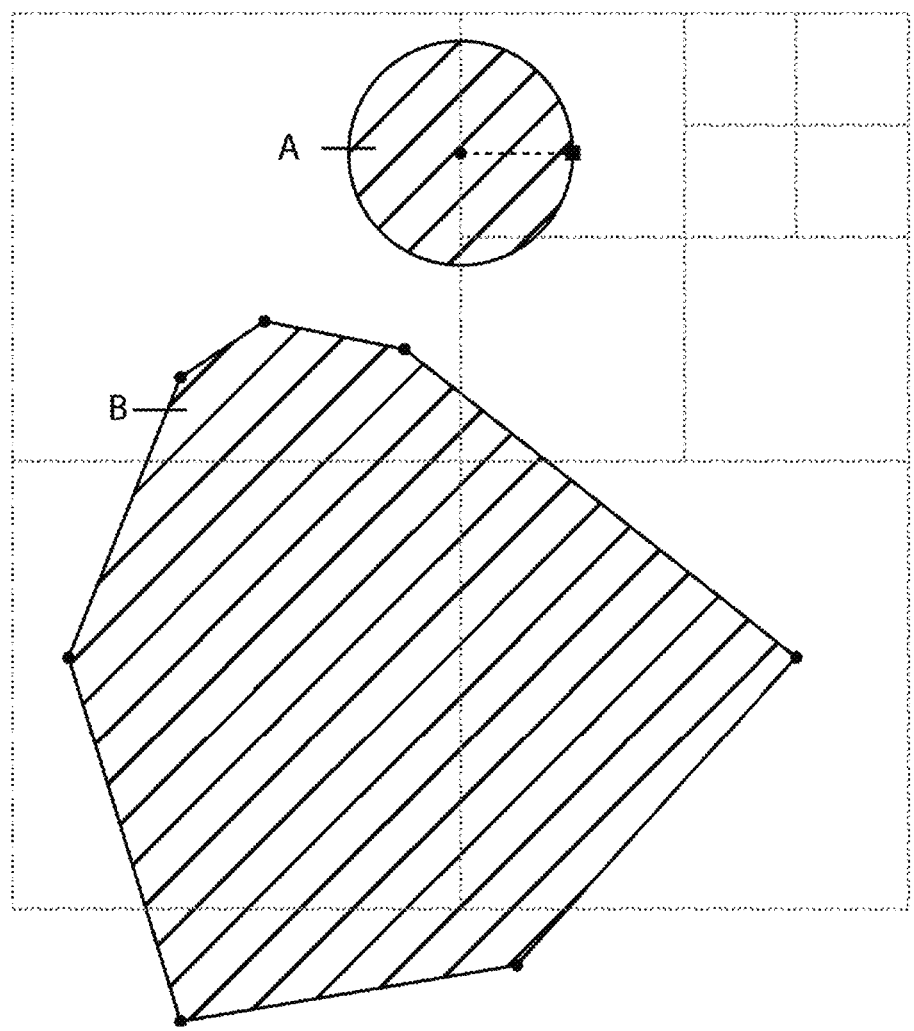
Figure 12:
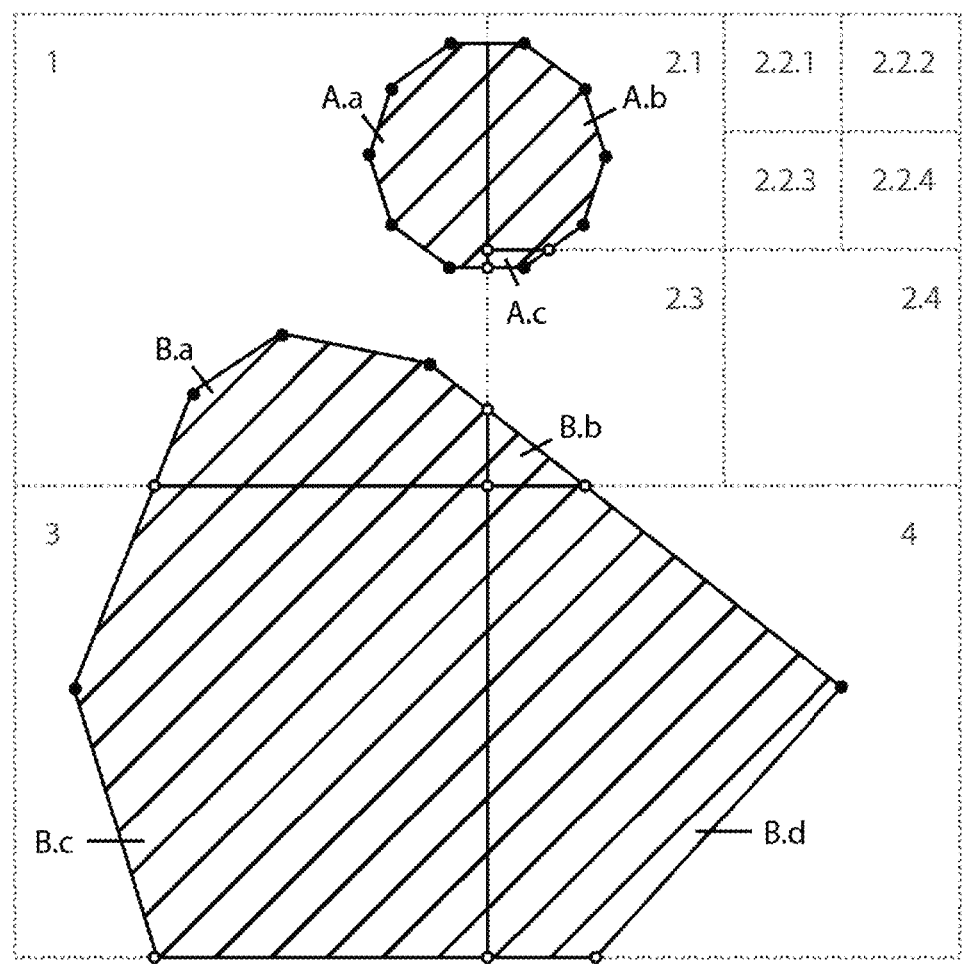
Figure 13:
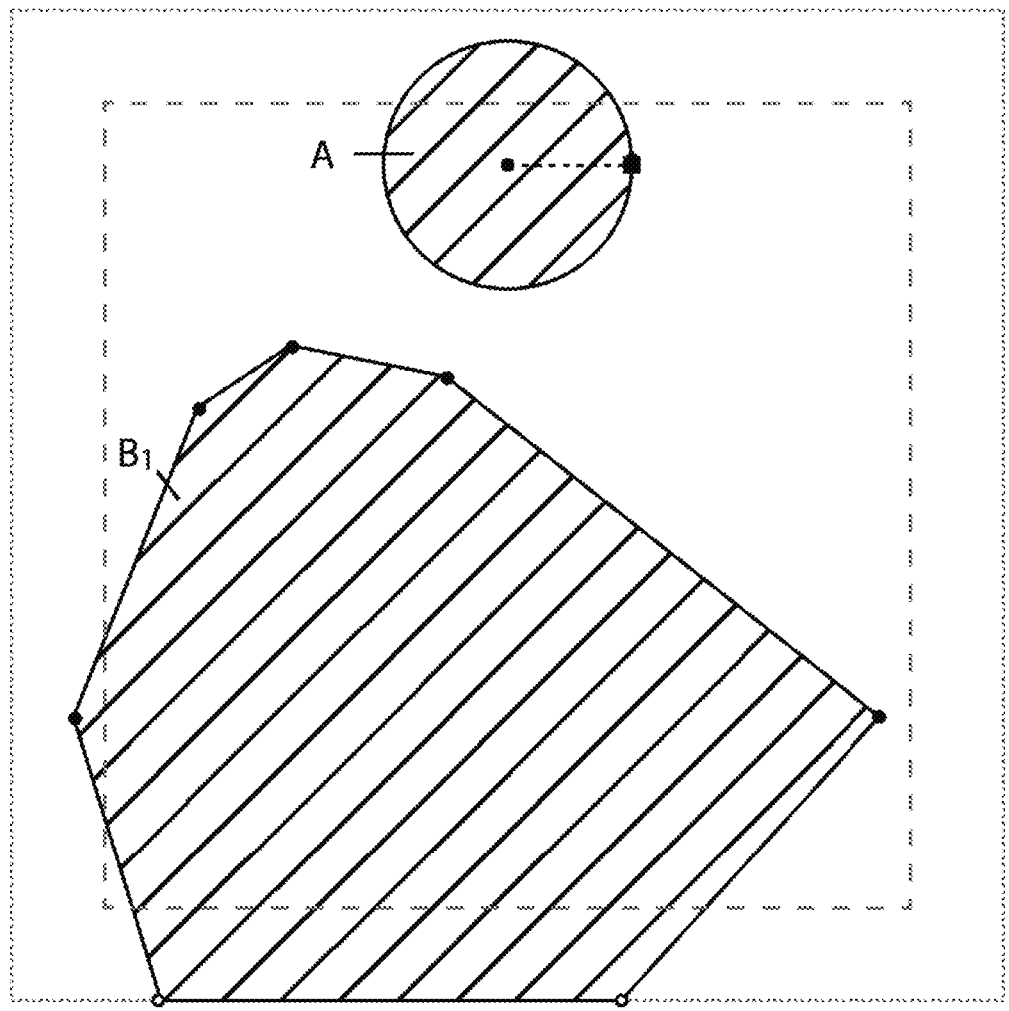
Figure 14:
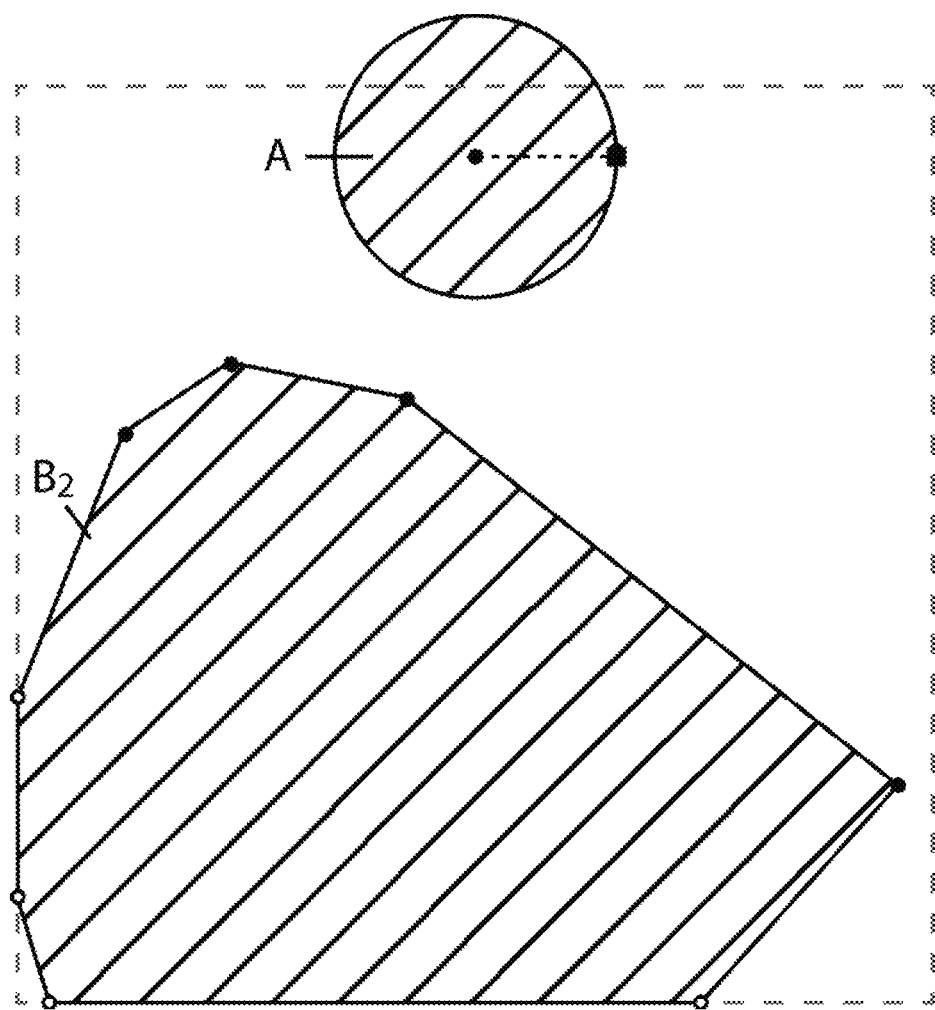
Figure 15:
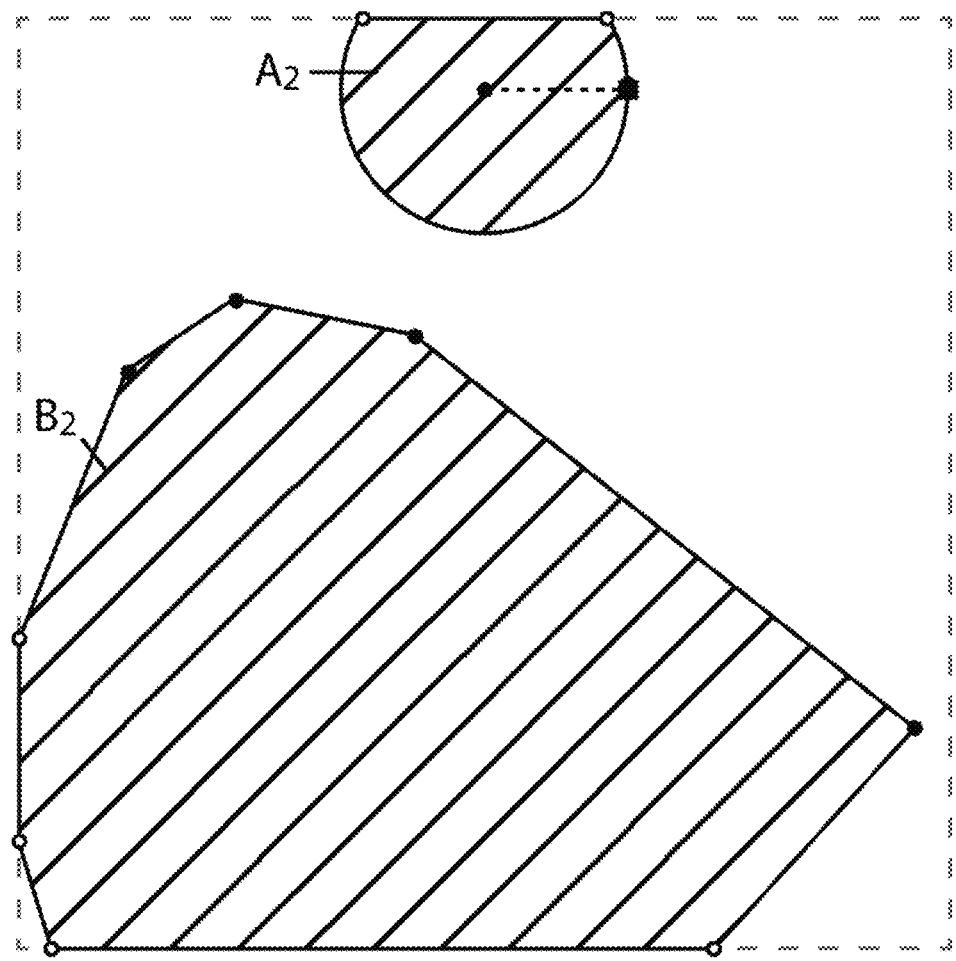
Figure 16:
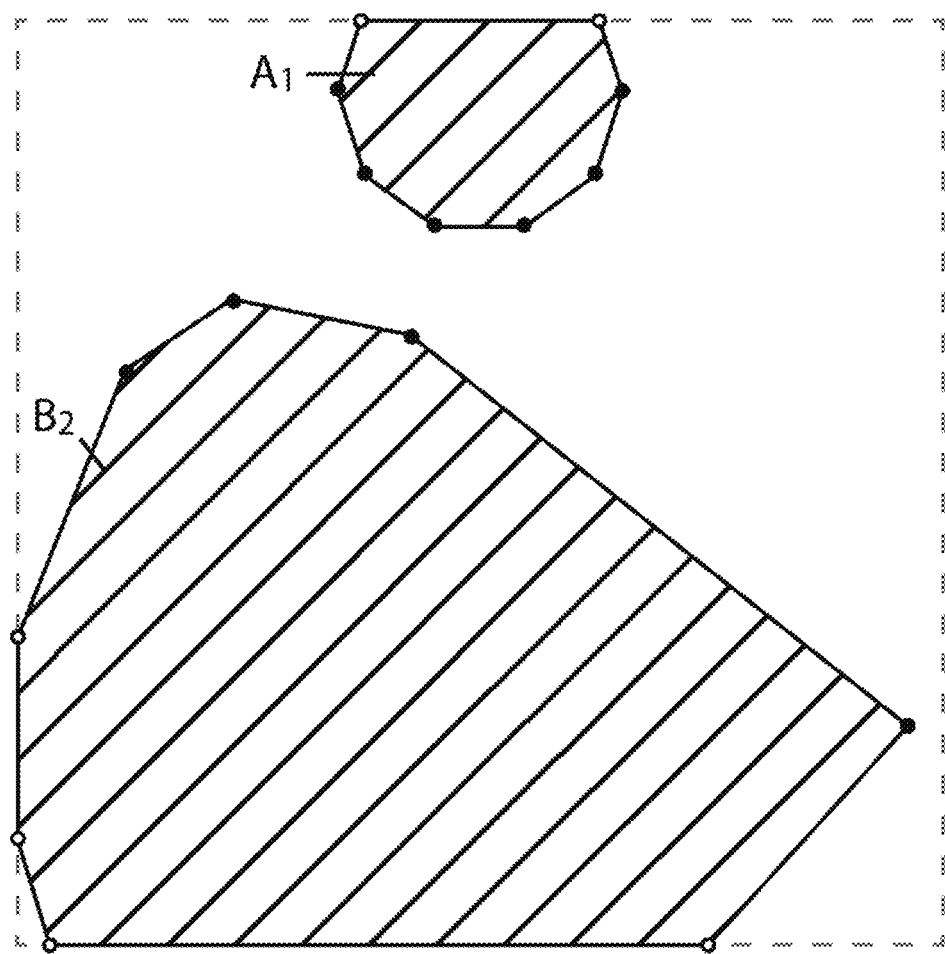
Figure 17:
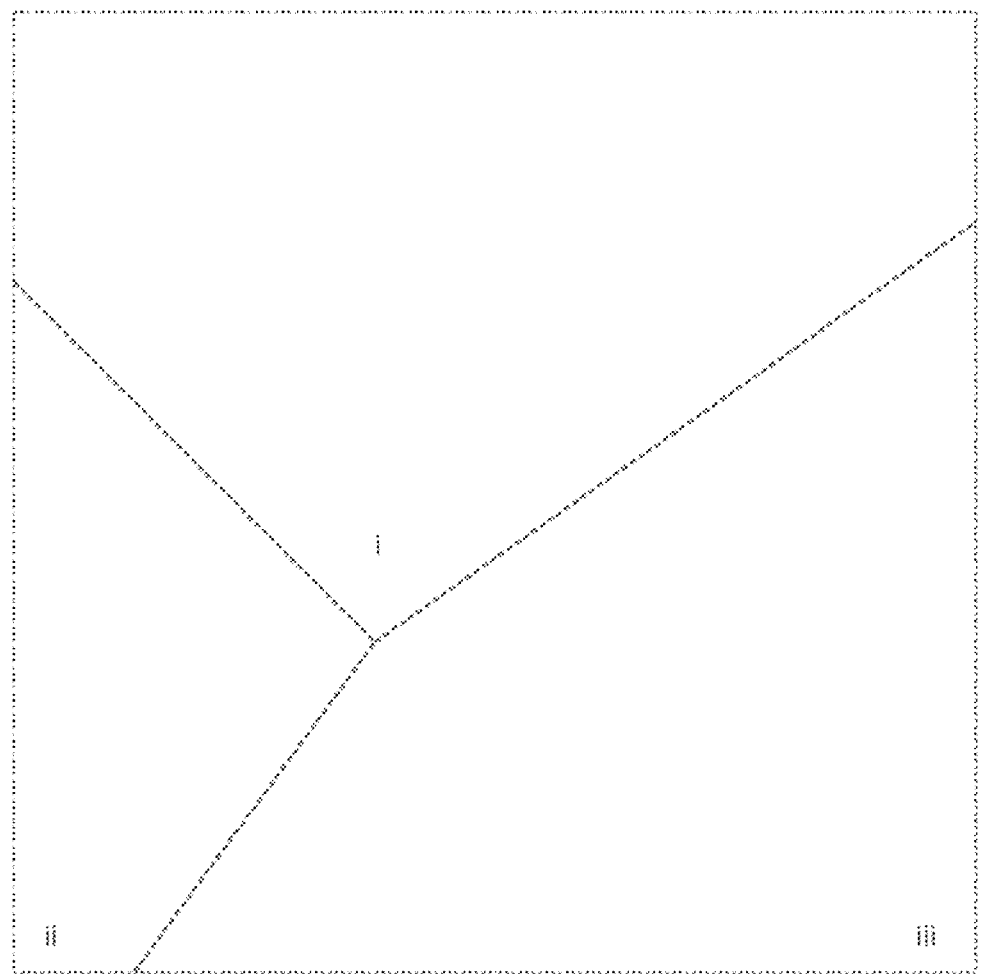
Figure 18:
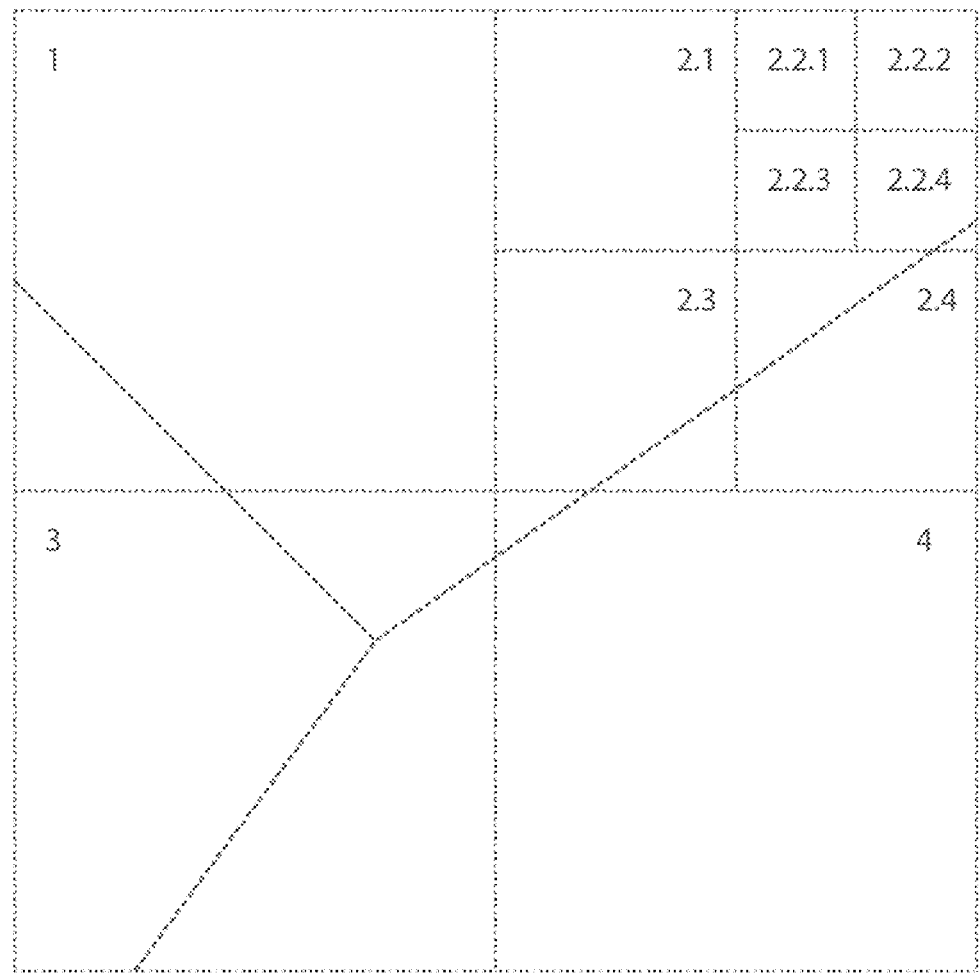

Turning to the specific figures, FIG. 10 is an exemplary geometric diagram of the tessellating system illustrating how information from the geospatial components is stored. Although the geometric subdivision of the space is shown in two-dimensions, one preferred system would divide the world using spherical geometry. FIG. 11 shows how the tessellating system views objects in space. Although the shown shapes could be any shape and could represent almost any structure, for the purpose of discussion, geometry A could be a drone and geometry B could be a building. FIG. 13 shows an exemplary tile and how the information could be stored. In FIG. 14, part of geometry A is outside of the desired boundary, but it is more efficient to store the entire geometry A (efficient mathematical storage format). FIG. 15 shows the use of clipping. FIG. 16 shows that the geometry examples can be converted from the efficient mathematical storage format to a complex polygon. FIGS. 17 and 18 show mapping of boundaries.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

It is to be understood that for methods or procedures disclosed herein that include one or more steps, actions, and/or functions for achieving the described actions and results, the methods' steps, actions, and/or functions may be interchanged with one another without departing from the scope of the present invention. In other words, unless a specific order of steps, actions, and/or functions is required for proper or operative operation of the methods or procedures, the order and/or use of specific steps, actions, and/or functions may be modified without departing from the scope of the present invention.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A method, comprising:
   managing, by a device, human-in-the-loop operations for at least one aerobot,
      the human-in-the loop operations comprising at least one of:
         at least one individual operator piloting an aerobot,
         control of aerobots using a mixture of human control and autonomy, or
         fully-autonomous management of aerobots with human oversight and override;
   collecting, by the device, aircraft data from a telemetry module,
      the aircraft data comprising at least one of:
         velocity,
         location, or
         altitude;
   collecting, by the device, flight information through a common interface module,
      the common interface module providing an interface in which a human may manually enter, review, or enter and review information, and
      the flight information comprising at least one of:
         hours flown,
         faults found,
         aerobot configuration,
         standard aircraft logbook information, or
         maintenance tracking information;
   generating, by the device, geospatial information,
      the geospatial information comprising a tile grid of a plurality of tessellated structures; and
   implementing, by the device, management of multiple networks of aerobots based on the geospatial information, the flight information, and the aircraft data,
      the multiple networks of aerobots including the at least one aerobot.

2. The method of claim 1, where the tessellated structures comprise a plurality of adjacent shapes.

3. The method of claim 1, further comprising:
   sensing at least one of:
      a hazard,
      a weather condition,
      a hazard marking,
      a feature marking,
      aircraft tracking,
      deployment of an enroute navigational aid, or
      deployment of a terminal navigational aid.

4. The method of claim 1, further comprising:
   obtaining image information for generating a three-dimensional model of at least one route for use by the at least one aerobot,
      where the three-dimensional model is used to determine whether the at least one route is sufficiently free of obstacles for GPS navigation of the at least one aerobot.

5. The method of claim 1, further comprising:
   tracking, in real time, at least one aerobot not in the multiple networks of aerobots using an Automatic Dependent Surveillance-Broadcast (ADS-B) system.

6. The method of claim 1, where collecting the aircraft data comprises:
   collecting the aircraft data for use in at least one of:
      offline analysis,
      data mining, or
      non-real-time applications.
7. The method of claim 1, further comprising:
   procuring insurance through the common interface module.
8. A non-transitory computer-readable medium storing instructions, the instructions comprising:
   one or more instructions that, when executed by one or more processors, cause the one or more processors to:
      manage human-in-the-loop operations for at least one aerobot,
         the human-in-the loop operations comprising at least one of:
            at least one individual operator piloting an aerobot,
            control of aerobots using a mixture of human control and autonomy, or
            fully-autonomous management of aerobots with human oversight and override;
      collect aircraft data from a telemetry module,
         the aircraft data comprising at least one of:
            velocity,
            location, or
            altitude;
      collect flight information through a common interface module,
         the common interface module providing an interface in which a human may manually enter, review, or enter and review information, and
         the flight information comprising at least one of:
            hours flown,
            faults found,
            aerobot configuration,
            standard aircraft logbook information, or
            maintenance tracking information;
      generate geospatial information,
         the geospatial information comprising a tile grid of a plurality of tessellated structures; and
      implement management of multiple networks of aerobots based on the geospatial information, the flight information, and the aircraft data,
         the multiple networks of aerobots including the at least one aerobot.
9. The non-transitory computer-readable medium of claim 8, where the tessellated structures comprise a plurality of adjacent shapes.
10. The non-transitory computer-readable medium of claim 8, where the one or more instructions, when executed by the one or more processors, further cause the one or more processors to:
   sense at least one of:
      a hazard,
      a weather condition,
      a hazard marking,
      a feature marking,
      aircraft tracking,
      deployment of an enroute navigational aid, or
      deployment of a terminal navigational aid.
11. The non-transitory computer-readable medium of claim 8, where the one or more instructions, when executed by the one or more processors, further cause the one or more processors to:
   obtain image information for generating a three-dimensional model of at least one route for use by the at least one aerobot,
      where the three-dimensional model is used to determine whether the at least one route is sufficiently free of obstacles for GPS navigation of the at least one aerobot.
12. The non-transitory computer-readable medium of claim 8, where the one or more instructions, when executed by the one or more processors, further cause the one or more processors to:
   track, in real time at least one aerobot not in the multiple networks of aerobots using an Automatic Dependent Surveillance-Broadcast (ADS-B) system.
13. The non-transitory computer-readable medium of claim 8, where the one or more instructions, that cause the one or more processors to collect the aircraft data, cause the one or more processors to:
   collect the aircraft data for use in at least one of:
      offline analysis,
      data mining, or
      non-real-time applications.
14. A device, comprising:
   one or more processors to:
      manage human-in-the-loop operations for at least one aerobot,
         the human-in-the loop operations comprising at least one of:
            at least one individual operator piloting an aerobot,
            control of aerobots using a mixture of human control and autonomy, or
            fully-autonomous management of aerobots with human oversight and override;
      collect aircraft data from a telemetry module,
      the aircraft data comprising at least one of:
         velocity,
         location, or
         altitude;
      collecting, by the device, flight information through a common interface module,
         the common interface module providing an interface in which a human may manually enter, review, or enter and review information, and
         the flight information comprising at least one of:
            hours flown,
            faults found,
            aerobot configuration,
            standard aircraft logbook information, or
            maintenance tracking information;
      generate geospatial information,
         the geospatial information comprising a tile grid of a plurality of tessellated structures; and
      implement management of multiple networks of aerobots based on the geospatial information, the flight information, and the aircraft data,
         the multiple networks of aerobots including the at least one aerobot.
15. The device of claim 14, where the tessellated structures comprise a plurality of adjacent shapes.
16. The device of claim 14, where the one or more processors are further to:
   sense at least one of:
      a hazard,
      a weather condition,
      a hazard marking, a feature marking,
aircraft tracking,
deployment of an enroute navigational aid, or
deployment of a terminal navigational aid.

17. The device of claim 14, where the one or more processors are further to:
obtain image information for generating a three-dimensional model of at least one route for use by the at least one aerobot,
where the three-dimensional model is used to determine whether the at least one route is sufficiently free of obstacles for GPS navigation of the at least one aerobot.

18. The device of claim 14, where the one or more processors are further to:
track, in real time, at least one aerobot not in the multiple networks of aerobots using an Automatic Dependent Surveillance-Broadcast (ADS-B) system.

19. The device of claim 14, where the one or more processors, when collecting the aircraft data, are to:
collect the aircraft data for use in at least one of:
offline analysis,
data mining, or
non-real-time applications.

20. The device of claim 14, where the one or more processors are further to:
procure insurance through the common interface module.

\* \* \* \* \*